United States Patent
Nagai et al.

(10) Patent No.: US 7,581,755 B2
(45) Date of Patent: Sep. 1, 2009

(54) AIRBAG DEVICE

(75) Inventors: Makoto Nagai, Wako (JP); Fumiharu Ochiai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/214,757

(22) Filed: Jun. 20, 2008

(65) Prior Publication Data

US 2008/0265552 A1  Oct. 30, 2008

Related U.S. Application Data

(62) Division of application No. 10/932,875, filed on Sep. 2, 2004, now Pat. No. 7,401,811.

(30) Foreign Application Priority Data

| Sep. 10, 2003 | (JP) | ............... 2003-317761 |
| Dec. 10, 2003 | (JP) | ............... 2003-411899 |
| Dec. 10, 2003 | (JP) | ............... 2003-412200 |
| Dec. 16, 2003 | (JP) | ............... 2003-417862 |
| Jun. 25, 2004 | (JP) | ............... 2004-188825 |
| Jun. 25, 2004 | (JP) | ............... 2004-188826 |

(51) Int. Cl.
*B60R 21/16* (2006.01)

(52) U.S. Cl. .................. 280/743.1; 280/743.2

(58) Field of Classification Search ............... 280/731, 280/743.1, 743.2

See application file for complete search history.

(56) References Cited

U.S. PATENT DOCUMENTS

| 5,219,179 A | 6/1993 | Eyrainer et al. |
| 5,280,954 A * | 1/1994 | Henseler et al. .......... 280/743.1 |
| 5,421,610 A | 6/1995 | Kavanaugh et al. |
| 5,470,106 A | 11/1995 | Nishimura et al. |
| 5,511,821 A | 4/1996 | Meyer et al. |
| 5,599,040 A | 2/1997 | Takahashi et al. |
| 5,833,265 A | 11/1998 | Seymour |
| 5,871,231 A | 2/1999 | Richards et al. |
| 6,017,058 A | 1/2000 | Ross |

(Continued)

FOREIGN PATENT DOCUMENTS

DE           198 37 897 A       3/2000

(Continued)

*Primary Examiner*—Toan C To
(74) *Attorney, Agent, or Firm*—Carrier, Blackman & Associates, P.C.; Joseph P. Carrier; William D. Blackman

(57) ABSTRACT

An airbag includes two base cloths sewn together at their outer peripheries by a seam extending from a central portion to the outer periphery of the base cloths into a vortical shape. When gas is supplied from an inflator to a center aperture of one of the base cloth to inflate the airbag, load generated by gas pressure breaks the seam sequentially from the central portion to the outer periphery, preventing sudden deployment of the airbag in fore and aft directions at the initial stage of deployment, thereby enabling not only soft restraining of passengers but also sufficient restraining by deploying the airbag into a final shape that is flat in fore and aft directions upon completion of breaking of the seam. The seam comprises a plurality of bonding portions such that the inflation breaks each of the bonding portions sequentially.

10 Claims, 40 Drawing Sheets

U.S. PATENT DOCUMENTS

| | | | |
|---|---|---|---|
| 6,059,312 A * | 5/2000 | Staub et al. | 280/729 |
| 6,352,283 B1 | 3/2002 | Ellerbrook et al. | |
| 6,634,670 B1 * | 10/2003 | Ellerbrok et al. | 280/743.1 |
| 6,676,158 B2 | 1/2004 | Ishikawa | |
| 6,793,245 B2 * | 9/2004 | Luders et al. | 280/743.1 |
| 6,877,765 B2 | 4/2005 | Rose et al. | |
| 6,886,857 B1 * | 5/2005 | Mishina et al. | 280/743.1 |
| 6,962,366 B2 | 11/2005 | Fukuda et al. | |
| 2005/0212276 A1 | 9/2005 | Yamada | |
| 2007/0152435 A1 * | 7/2007 | Jamison et al. | 280/743.2 |
| 2007/0241546 A1 * | 10/2007 | Chida et al. | 280/739 |

FOREIGN PATENT DOCUMENTS

| | | | |
|---|---|---|---|
| EP | 1 391 352 A | 2/2004 | |
| FR | 2 308 525 A | 11/1976 | |
| GB | 2 328 650 A | 3/1999 | |
| JP | 06-286568 | 10/1994 | |
| JP | 07-125586 | 5/1995 | |
| JP | 07-205738 | 8/1995 | |
| JP | 08-020305 | 1/1996 | |
| JP | 08-119052 | 5/1996 | |
| JP | 09-315246 | 12/1997 | |
| JP | 10-297409 | 11/1998 | |
| JP | 2000-043665 | 2/2000 | |
| JP | 2002-067849 | 3/2002 | |
| JP | 2002-274307 | 9/2002 | |

* cited by examiner

STRESS CONCENTRATION PORTION

UNBREAKABLE PORTION

UNBREAKABLE PORTION

AIRBAG DEVICE

CROSS-REFERENCES TO RELATED APPLICATIONS

The present application is a divisional of prior U.S. patent application Ser. No. 10/932,875, filed 2 Sep. 2004, which claims priority under 35 USC 119 based on Japanese patent application Nos. 2003-317761, filed 10 Sep. 2003, and 2003-411899, filed on 10 Dec. 2003, and 2003-412200, filed on 10 Dec. 2003 and 2003-417862, filed on 16 Dec. 2003 and 2004-188825, filed on 25 Jun. 2004 and 2004-188826, filed on 25 Jun. 2004. The subject matter of each of these priority documents is incorporated by reference herein.

BACKGROUND OF THE INVENTION

1) Field of the Invention

The present invention relates to an airbag device having an airbag, the airbag comprising first and second base cloths sewn at their outer peripheries, and inflated by supplying gas generated by an inflator to the inside of the airbag through a central portion of one base cloth upon collision of a vehicle.

2) Description of the Related Art

Airbags for driver's seats, which are deployed from a central portion of a steering wheel into a vehicle compartment, generally comprises two circular base cloths sewn together at their outer peripheries. Japanese Patent Application Laid-open No. 7-125586 discloses an airbag comprising two base cloths sewn together in V-letter-shaped seams which are spread out radially from the inside to the outside in such a manner that the seams are broken by load generated upon inflation of the airbag, thus preventing the airbag to suddenly expand in fore and aft directions, and allowing the airbag to deploy in fore and aft directions in an overall flat shape in order to softly restrain passengers.

Moreover, Japanese Patent Application Laid-open No. 8-119052 discloses an airbag comprising two base cloths sewn together in breakable circular seams, with a gas intake hole and a gas discharge hole respectively formed radially from the inside to the outside of the seam, thus preventing the airbag to expand at once in fore and aft directions during the initial stage of deployment, and preventing excessive buildup of the internal pressure of the airbag after breaking of the seam by allowing the gas intake hole and the gas discharge hole to communicate with each other.

Incidentally, the airbags described in Japanese Patent Application Laid-open No. 7-125586 and Japanese Patent Application Laid-open No. 8-119052 both include their starting points of break of seams sewn in a V-letter shape, so that the threads on either side of the vertex of the V-letter shape disperse the load of gas pressure which attempts to push and separate the two base cloths, thus inhibiting the smooth break of seams.

Moreover, in the airbag described in Japanese Patent Application Laid-open No. 8-119052, since the seam is formed in a generally annular shape, the airbag inflates in two stages, namely before and after the break of the seam, causing an abrupt change in the airbag's internal pressure and making a smooth deployment difficult.

BRIEF SUMMARY OF THE INVENTION

In consideration of the above, it is an object of the present invention to provide an airbag which ensures the separation of a separable bonding portion joining first and second base cloths by means of stress by gas pressure, and which enhances passenger-restraining capability by arbitrarily controlling the internal pressure of the airbag during deployment.

In order to achieve the above objects, according to a first feature of the invention, there is provided an airbag device having an airbag, the airbag comprising first and second base cloths sewn at their outer peripheries, and inflated by supplying gas generated by an inflator to the inside of the airbag through a central portion of one base cloth upon collision of a vehicle, wherein the first and second base cloths are joined by a bonding portion continuously extending in a generally circumferential direction from the central portion towards the outer periphery, and wherein load caused by inflation of the airbag breaks the bonding portion from the central portion end towards the outer periphery end thereof.

With this arrangement, the first and second base cloths are bonded together by the bonding portions continuously extending in generally a circumferential direction from the central portion to outer peripheries, and the bonding portion is sequentially broken from the central portion to the outer periphery by means of load generated during inflation of the airbag. Therefore, sudden deployment of the airbag in fore and aft directions during the initial stage of deployment is prevented, and soft restraint of passengers is possible by appropriately controlling change in the internal pressure of the airbag to gradually increase the volume of the airbag. Moreover, upon completion of the breaking of the bonding portion, a sufficient restraining force is achieved by deploying the airbag into a final shape that is flat in fore and aft directions. In addition, the linear shape of the bonding portion allows reliable breaking by concentrating a large stress on the ends thereof, and the bonding portion extending in a circumferential direction does not obstruct folding of the base cloths, thus reducing the size of airbag after folding.

According to a second feature of the invention, in addition to the first feature, the bonding portion is vortical.

With this arrangement, the vortical shape of the bonding portions eliminates abrupt change in the breaking direction, thus providing smooth breaking of the bonding portion and easy control of the internal pressure and deployment speed of the airbag.

According to a third feature of the invention, in addition to the second feature, the bonding portion is divided into a plurality of parts in a radial direction of the airbag.

With this arrangement, the division of the bonding portion into multiple parts in a radial direction allows variation in the separation strength of the bonding portion and in distance between the adjacent parts, thus facilitating control of the internal pressure and deployment speed of the airbag.

According to a fourth feature of the invention, in addition to the second feature, the bonding portion has separation portions where bondage is interrupted, and the separation portions are disposed at different locations in a circumferential direction in relation to a radially inner end of the bonding portion.

With this arrangement, since the bonding portion has the separation portions where the bondage is interrupted, even when a section of the bonding portion is pressed down and breaking is terminated there, the breaking restarts from an end where the bonding portion leading a separation portion, thus deploying the airbag without hindrance. Further, since the separation portions are displaced in regard to the radial inner end of the bonding portion in a circumferential direction, to lower the probability that the radial inner end of the bonding portion and separation portion are simultaneously pressed down, thus enabling further reliable deployment of the airbag.

According to a fifth feature of the invention, in addition to the second feature, the bonding portion has separation portions where bondage is interrupted, and a radially inner end of the bonding portion and/or an inner end of the separation portion are oriented towards the central portion of the airbag.

With this arrangement, by placing separation portions at bonding portions where the bondage is interrupted, even if a section of the bonding portion is pressed down and breaking is stopped there, the breaking restarts from an end where the bonding portion leading to a separation portion, thus deploying the airbag without hindrance. Further, since the radially inner end of the bonding portion and/or the inner end the separation portion is oriented towards the central portion of the airbag, load of the pressure of gas generated by an inflator provided at the central portion of the airbag is effectively concentrated on the radially inner end of the bonding portion and/or the inner end the separation portion, thus providing a reliable breaking.

According to a sixth feature of the invention, in addition to the first feature, the bonding portion is divided into a plurality of parts in a switchbacking shape and disposed in a circumferential direction.

With this arrangement, by dividing the bonding portion into a plurality of switchbacking pars and disposing them in a circumferential direction, separation strength can be set or tuned separately for each divided part, thus allowing a more favorable control of airbag deployment. Further, even if some divided parts of the bonding portion are pressed down and breaking is stopped there, since the probability that the other divided parts are simultaneously pressed down is low, the other divided parts will break to ensure a reliable airbag deployment.

According to a seventh feature of the invention, in addition to the first feature, the radial inner ends of the bonding portion have a separation strength higher than that of the other parts.

With this arrangement, since the radial inner ends of the bonding portion have a separation strength higher than that of the other parts, the internal pressure of the airbag during the initial stage of deployment is rapidly increased, thus providing a favorable passenger-restraining capability.

According to an eighth feature of the invention, in addition to the first feature, sewing forms the bonding portion, and the first and second base cloths are bonded together by adhesion or welding at parts corresponding to the bonding portion.

With this arrangement, by adhesion or welding of the base cloths at parts corresponding to the breakable bonding portion while superimposing the base cloths constituting the airbag, not only gas leakage is prevented by adhesion or welding filling the thread holes of the bonding portion, but also the internal pressure of the airbag is decreased by delaying the breaking of the bonding portion while alleviating damage received by the base cloths upon breaking by lowering the breaking strength of the bonding portion. Although it is difficult to set the breaking strength and breaking start point only by adhesion or welding, combination of adhesion or welding with sewing facilitates the setting of the breaking strength and breaking start point.

According to a ninth feature of the invention, in addition to the first feature, at least a portion of a periphery of a vent hole formed on at least one of the first and second base cloths is surrounded by an auxiliary bonding portion which continues to the bonding portion, and the vent hole is opened by breaking of the auxiliary bonding portion accompanying breaking of the bonding portion.

With this arrangement, at least a portion of a periphery of a vent hole formed on at least one of the first and second base cloths is surrounded by an auxiliary bonding portion which continues to the bonding portion, and the vent hole is opened by breaking of the auxiliary bonding portion accompanying breaking of the bonding portion. Therefore, the vent hole is open at an arbitrary timing during deployment of the airbag, thereby enabling a further precise control of the internal pressure of the airbag.

According to a tenth feature of the invention, in addition to the first feature, an end of a vent hole cover which closes a vent hole formed on at least one of the first and second base cloths is joined to the bonding portion in the vicinity of the outer periphery of the airbag, and the end of the vent hole cover is separated from the first and second base cloths by breaking of the bonding portion to open the vent hole.

With this arrangement, by joining the end of the vent hole cover to the bonding portion in the vicinity of the outer periphery of the airbag, the end of the vent hole cover is separated from the base cloths by breaking of the bonding portion during the final stage of airbag deployment, to thereby open the vent hole. Therefore, the vent hole is maintained in a closed state until the airbag deployment is substantially completed, thereby promoting the increase of the internal pressure. Further, upon completion of airbag deployment, the gas is discharged through the vent hole, thereby suppressing excessive increase in the internal pressure. In addition, the timing of opening the vent hole is easily controlled by adjusting the location at which the end of the vent hole cover is joined to the bonding portion.

According to an eleventh feature of the invention, in addition to the tenth feature, the vent hole cover is joined at a portion of the periphery of the vent hole.

With this arrangement, by joining the vent hole cover at a portion of the periphery of the vent hole, the direction of the gas discharged through the vent hole is regulated by the vent hole cover.

According to a twelfth feature of the invention, in addition to the first feature, a duct with one end communicating with a vent hole formed on at least one of the first and second base cloths, and the other end joined to the bonding portion in the vicinity of the outer periphery of the airbag to be closed, is placed along inner faces of the first and second base cloths, and the vent hole is opened by opening the closed other end of the duct by breaking of the bonding portion.

With this arrangement, by placing a duct along the inner faces of the base cloths, with one end communicating with a vent hole and the other end joined to the bonding portion to be closed, the bonding portion breaks at the final stage of deployment of the airbag to open the closed other end of the vent hole cover thus opening the vent hole. Therefore, the vent hole is maintained in a closed state until the airbag deployment is substantially completed, thereby promoting the increase of the internal pressure. Further, upon completion of airbag deployment, the gas is discharged through the vent hole, thereby suppressing excessive increase in the internal pressure. In addition, the timing of opening the vent hole is easily controlled by adjusting the location at which the end of the vent hole cover is joined to the bonding portion, and discharge volume of the gas is controlled by changing the duct diameter.

According to a thirteenth feature of the invention, in addition to the first feature, a duct with one end communicating with a vent hole formed on at least one of the first and second base cloths, and the other end joined to the bonding portion in the vicinity of the outer periphery of the airbag to be closed, is placed outside the airbag, and the vent hole is opened by opening the closed other end of the duct by breaking of the bonding portion.

With this arrangement, by placing a duct at the exterior of the airbag, with one end communicating with a vent hole and the other end joined to the bonding portion to be closed, the bonding portion breaks at the final stage of deployment of the airbag to open the closed other end of the vent hole cover thus opening the vent hole. Therefore, the vent hole is maintained in a closed state until the airbag deployment is substantially completed, thereby promoting the increase of the internal pressure. Further, upon completion of airbag deployment, the gas is discharged through the vent hole, thereby suppressing excessive increase in the internal pressure. In addition, the timing of opening the vent hole is easily controlled by adjusting the location at which the end of the vent hole cover is joined to the bonding portion, and discharge volume of the gas is controlled by changing the duct diameter. Further, by placing the duct in a direction going away from the passenger, discharged gas can be prevented from exerting on the passenger. Additionally, by placing the duct outside the airbag, the duct length can be freely set, thus allowing a further appropriate control of the gas discharge volume and discharge duration.

According to a fourteenth feature of the invention, in addition to any of the ninth to thirteenth features, at least one of the first and second base cloths has a gas discharge portion which is opened when the vent hole fails to function and the internal pressure of the airbag reaches or exceeds a predetermined level, thereby depressurizing the airbag.

With this arrangement, when the vent hole formed on at least one of the first and second base cloths fails to function for some reason and the internal pressure of the airbag reaches or exceeds a predetermined level, the gas discharge portion is opened by such a internal pressure, thereby depressurizing the airbag. Therefore, the gas discharge portion can function as a vent hole to prevent excessive increase of the internal pressure of the airbag.

The seam 39 of the embodiments corresponds to the bonding portion in the present invention, the non-sewn portions 39a and 39b of the embodiments correspond to the non-bonding portion in the present invention, the auxiliary seam 60 of the embodiments corresponds to the auxiliary bonding portion in the present invention, and the fragile portions 38a, 53 and 61 of the embodiments correspond to the gas discharge portion of the present invention.

The above and other objects, features and advantages of this invention will be more clearly understood from the following detailed description of the preferred embodiments with reference to the accompanying drawings.

BRIEF DESCRIPTION OF THE DRAWINGS

FIG. 1 is a perspective view of a front portion of a vehicle compartment of a motor vehicle.

FIG. 2 is an enlarged sectional view taken along line 2-2 in FIG. 1.

FIG. 3 is an exploded perspective view of an airbag.

FIG. 4 is a rear view of the airbag.

FIG. 5 is a front view of the airbag.

FIG. 6 is a sectional view taken along line 6-6 in FIG. 4.

FIG. 18 is a front view of the airbag.

FIG. 19 is a rear view of the airbag.

FIG. 20 is an enlarged sectional view taken along line 20-20 in FIG. 18.

FIGS. 24 to 28B show a seventeenth embodiment of the present invention.

FIG. 24 is an exploded perspective view of an airbag.

FIG. 25 is a front view of the airbag.

FIG. 26 is a rear view of the airbag.

FIG. 27 is an enlarged sectional view taken along line 27-27 in FIG. 26.

FIGS. 28A and 28B are effect explanatory diagrams of the airbag during deployment.

FIG. 32 is a view corresponding to FIG. 24.

FIG. 33 is an effect explanatory diagram of the airbag during deployment.

FIGS. 34 to 35B show a twenty-second embodiment of the present invention.

FIG. 34 is a drawing corresponding to FIG. 24.

FIGS. 35A and 35B are effect explanatory diagrams of the airbag during deployment.

FIGS. 36 to 37B show a twenty-third embodiment of the present invention.

FIG. 36 is a drawing corresponding to FIG. 26.

FIGS. 37A and 37B are enlarged sectional views taken along line 37-37 in FIG. 36.

DETAILED DESCRIPTION OF THE PREFERRED EMBODIMENTS

Referring to FIGS. 1 to 6, a first embodiment of the present invention will be described below.

Figure 1:
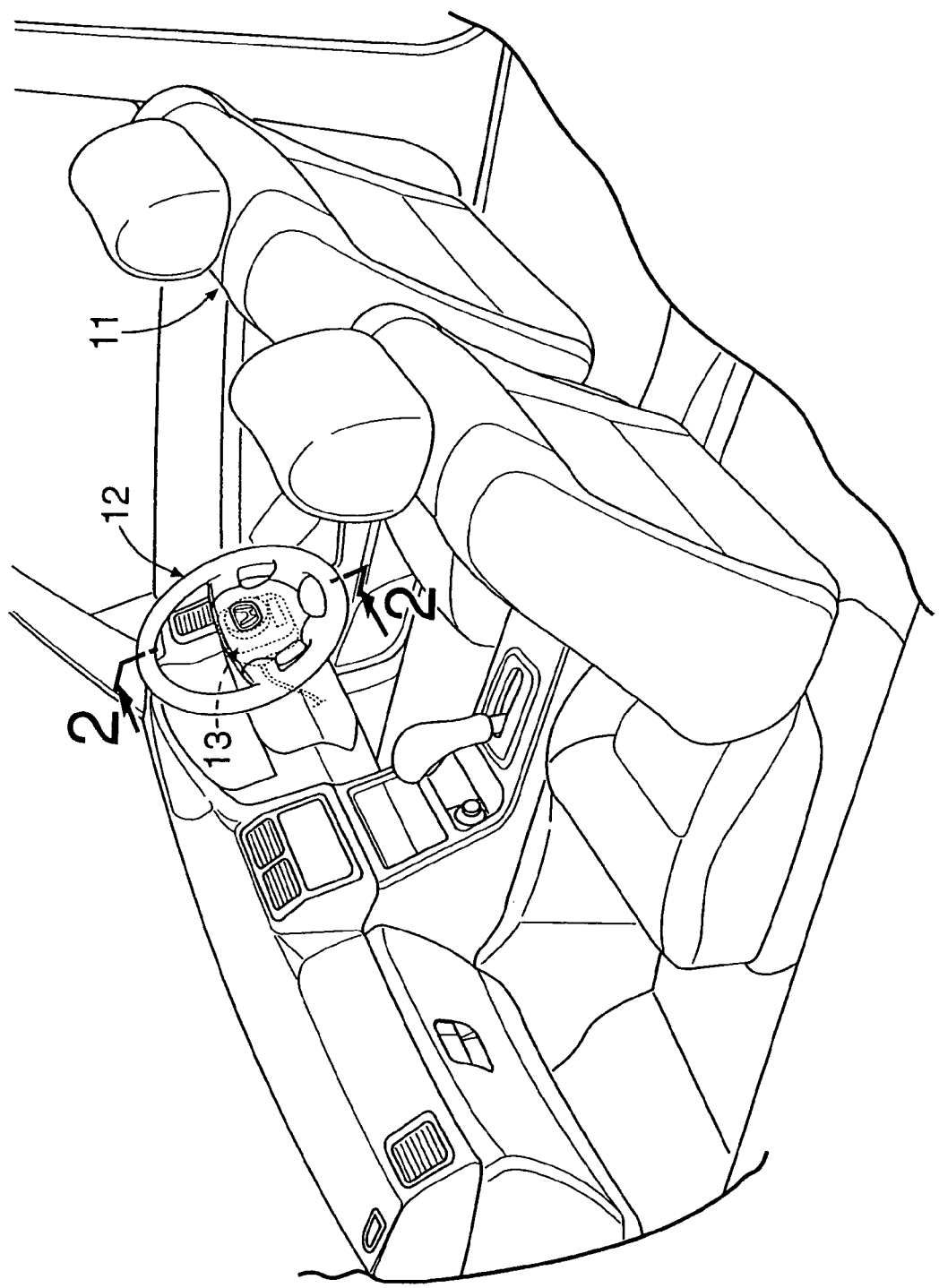
FIGS. 1 to 6 show a first embodiment of the present invention.

As shown in FIG. 1, an airbag module 13 for a driver's seat is stored inside a steering wheel 12 disposed in front of a driver's seat 11.

Figure 2:
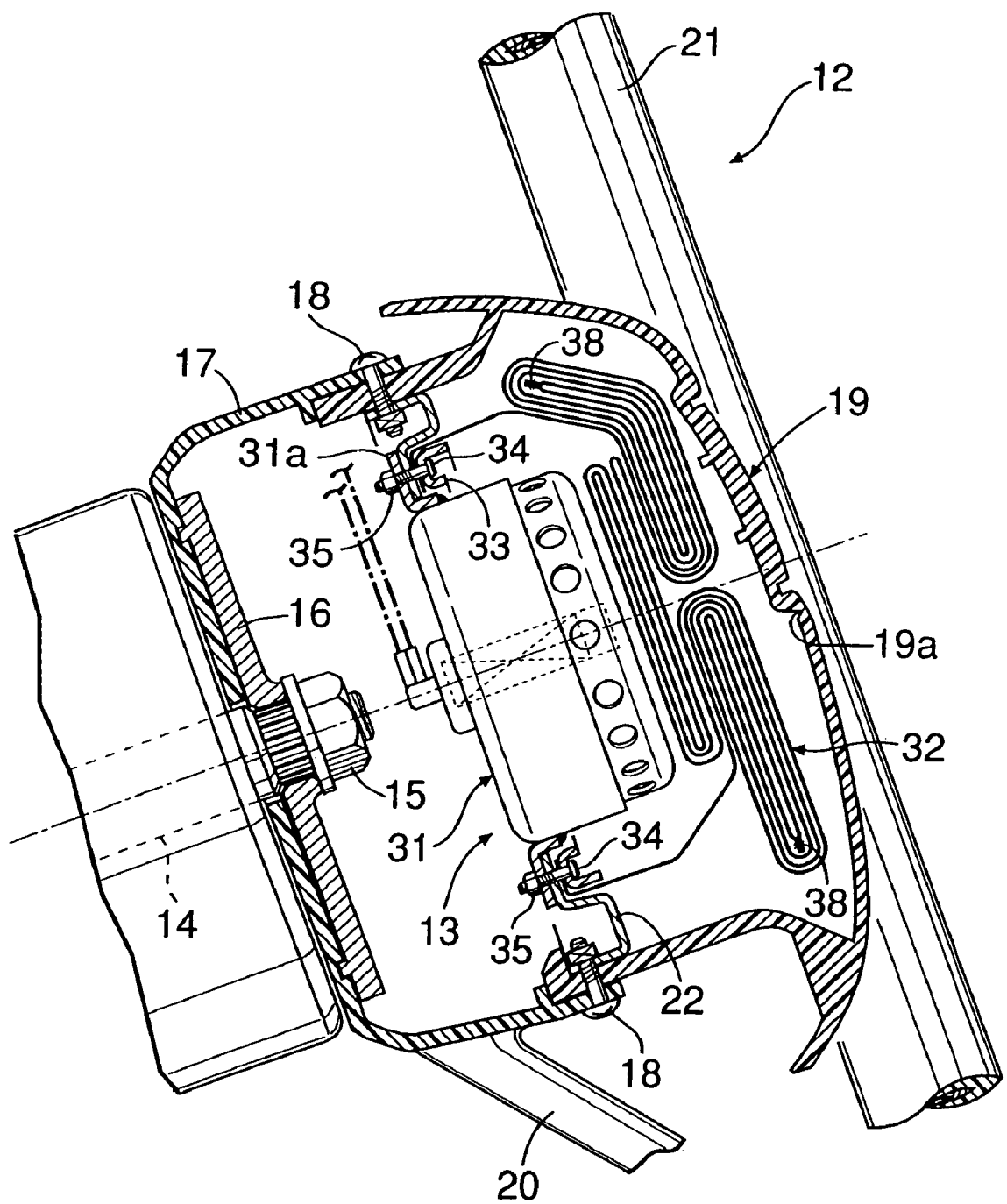

As shown in FIG. 2, the steering wheel 12 comprises a boss portion 16 fixed to the rear end of a steering shaft 14 by a nut 15, a front cover 17 fixed to the boss portion 16, a rear cover 19 fixed to a back side of the front cover 17 by bolts 18 . . . , a plurality of spoke portions 20 . . . radially extending from the front cover 17, and a steering wheel main body 21 which leads to the outer peripheries of the spoke portions 20 . . . . A retainer 22, bolted together with bolts 18 . . . to an inner periphery of the rear cover 19, supports the airbag module 13. A thin-walled tear line 19a, which breaks during inflation of the airbag 32, is formed on the inside of the rear cover 19.

The airbag module 13 comprises an inflator 31 filled with a propellant to generate high-pressure gas by combustion, an airbag 32 composed of sewn base cloths, and a fixing ring 33 which fixes a base portion of the airbag 32. A flange 31a of the inflator 31 and the fixing ring 33 are superimposed onto the front and rear sides of the retainer 22, and bolted by bolts 34 . . . and nuts 35 . . . , while fixing a base portion of the airbag 32 which is sandwiched between the rear side of the retainer 22 and the front side of the fixing ring 33.

Figure 3:
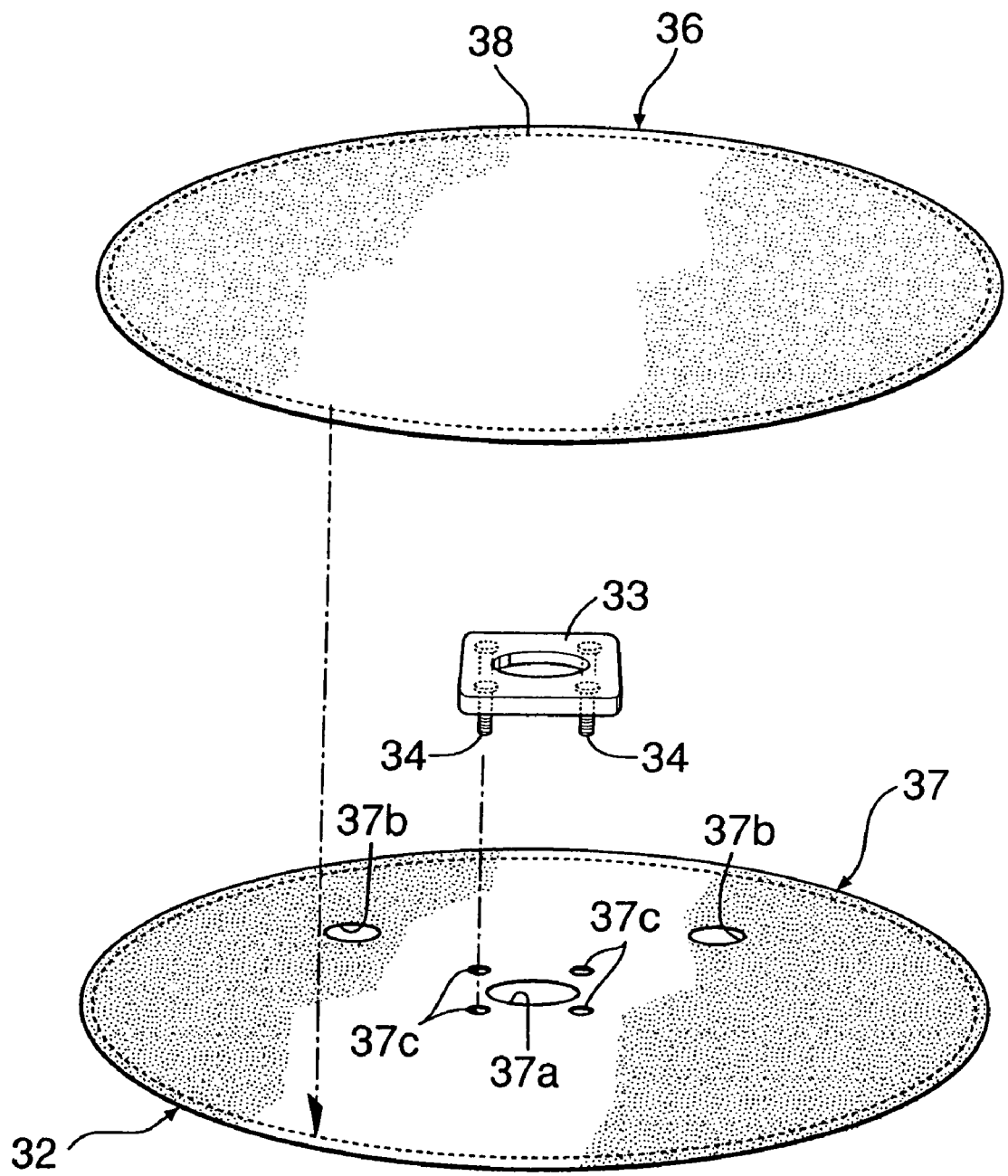

As shown in FIG. 3, the circular airbag 32 comprises a rear first base cloth 36 which faces the passenger, and a front second base cloth 37 which is superimposed onto the front of the rear base cloth 36. The first and second base cloths 36 and 37 are integrally sewn at an outer peripheral seam 38. A circular aperture 37a which encircles the inflator 31, and two vent holes 37b and 37b which release a portion of the gas during inflation of airbag 32, and four bolt holes 37c . . . through which the bolts 34 . . . pass are formed on the second base cloth 37 of airbag 32. Therefore, the airbag 32 is supported at the central portion of second base cloth 37 by a retainer 22, and the gas generated by the inflator 31 is supplied to the interior of the airbag 32 through the aperture 37a formed in the center of second base cloth 37.

Figure 4:
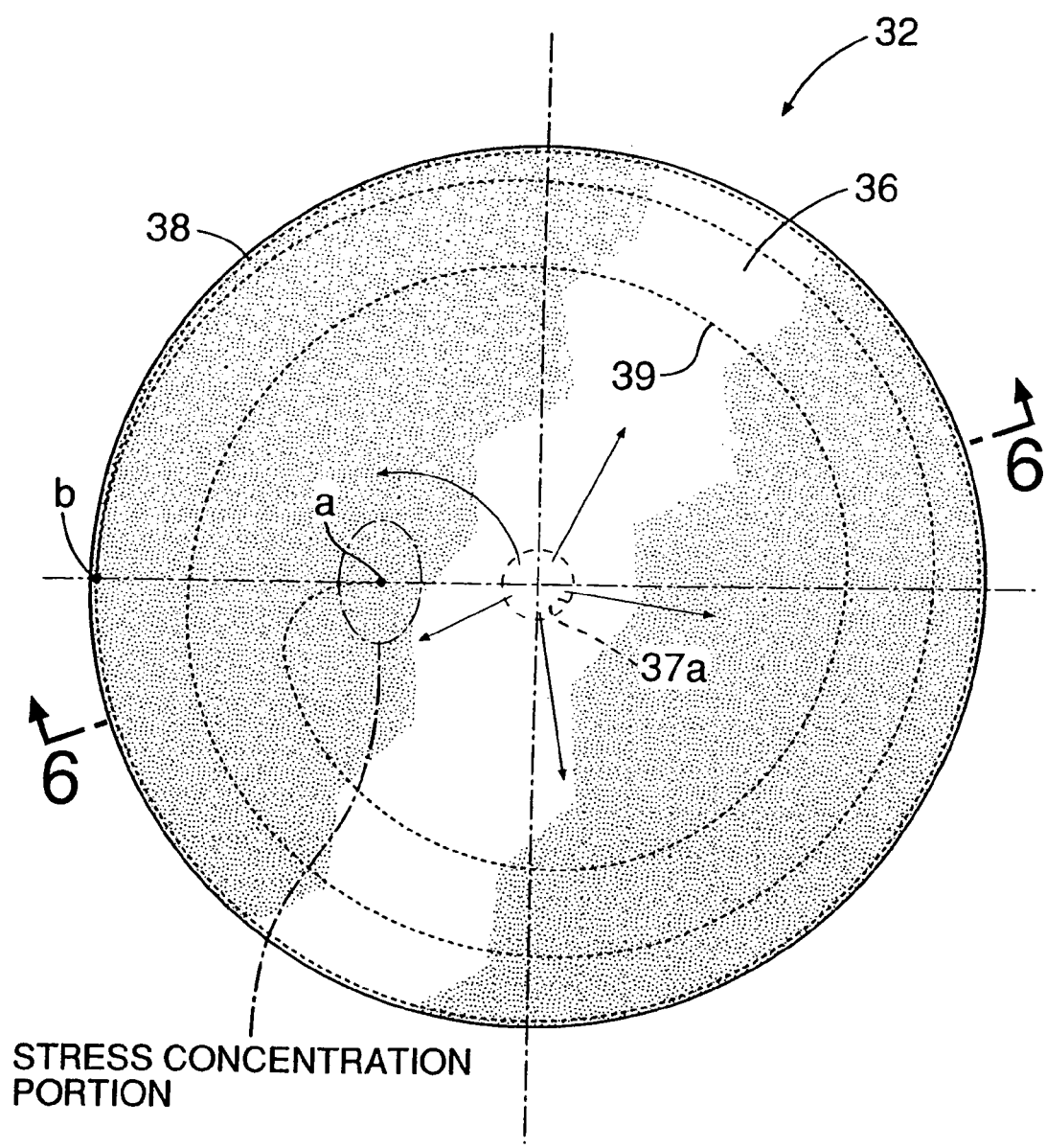
Figure 5:
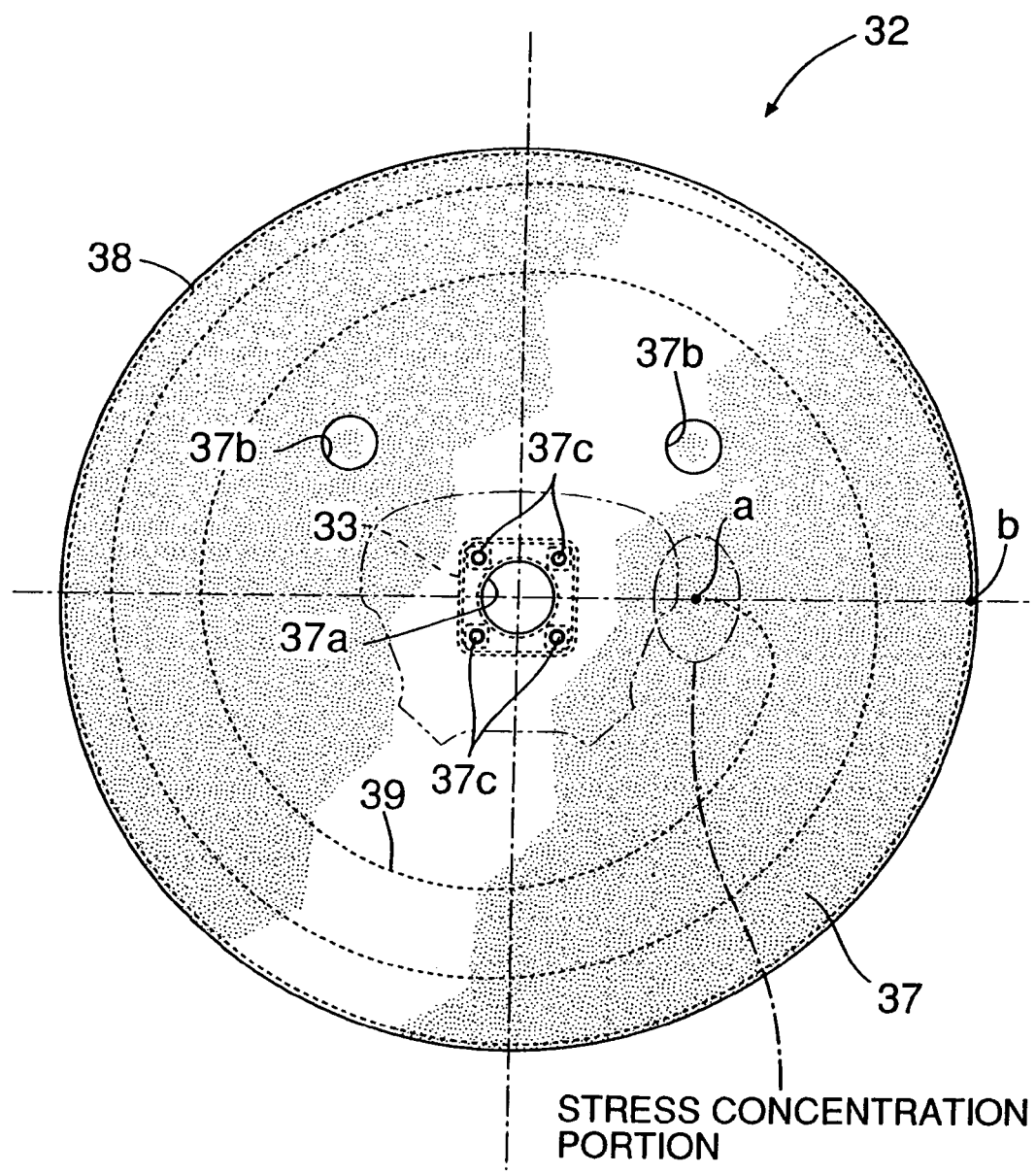

As shown in FIGS. 4 and 5, the superimposed first and second base cloths 36 and 37 are sewn together by one vortical seam 39 which starts from point a near the center, to point b in the outer periphery. While the outer peripheral seam 38 is firmly sewn by using a thicker thread to prevent breaking during inflation of airbag 32, vortical seam 39 is fragilely sewed using a finer thread to encourage breaking during inflation of the airbag 32. Point a at the radial inner end of the vortical seam 39 is oriented towards the central portion of airbag 32, i.e., the inflator 31.

Thus, when an acceleration exceeding a predetermined value is detected upon collision of the vehicle, the inflator 31 is ignited to generate gas, which starts the inflation of folded airbag 32. The tear line 19a of the rear cover 19 breaks when receiving pressure from the inflating airbag 32, to form an aperture through which the airbag 32 deploys itself inside the vehicle compartment.

Figure 6:
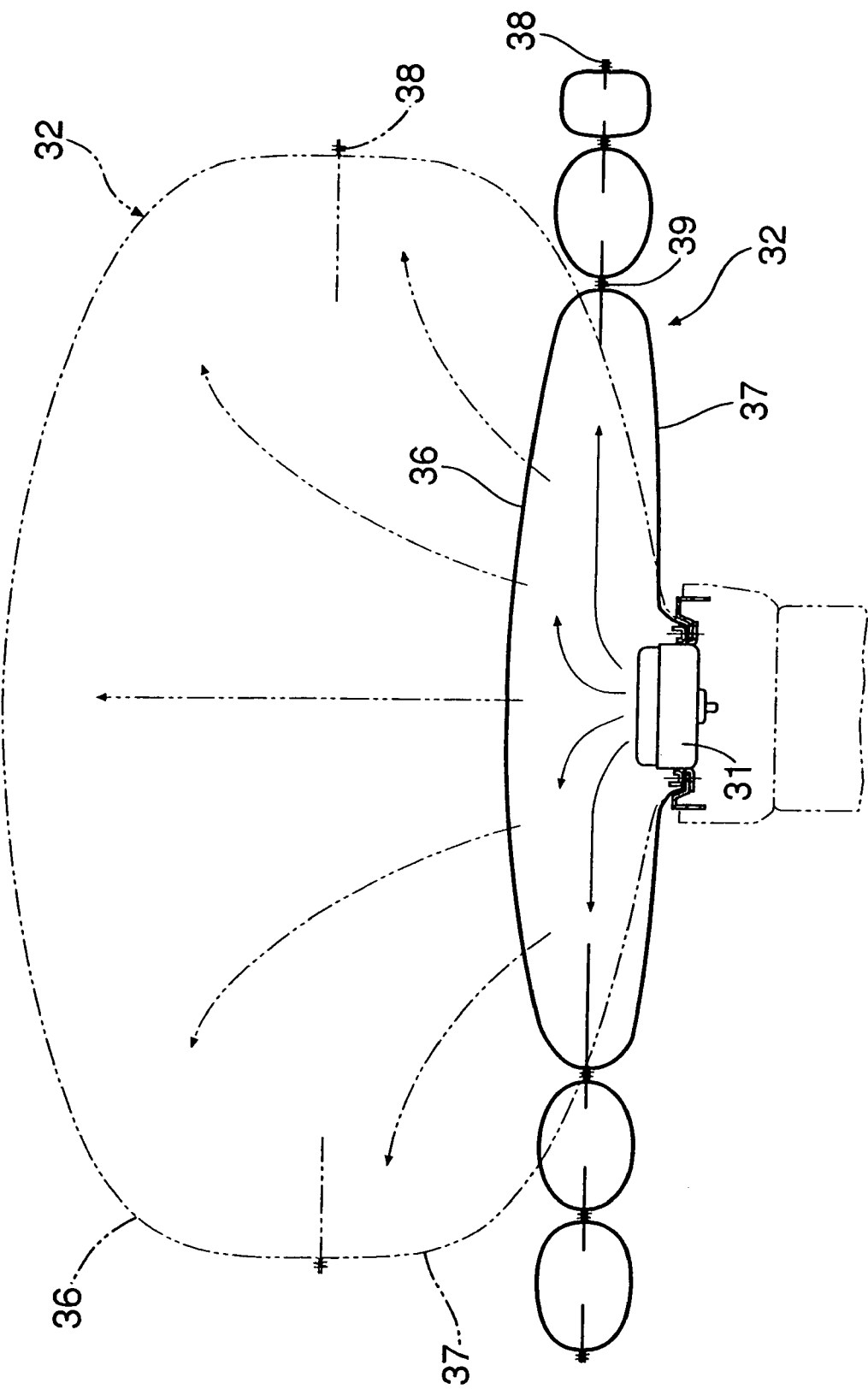

As shown in FIGS. 4 to 6, because the first and second base cloths 36 and 37 are integrally joined by the vortical seam 39, sudden inflation of the airbag 32 in fore and aft directions is prevented during the inflation process of the airbag 32, thereby enabling a soft restraining of the passenger. During inflation, because a strong stress is concentrated on the inner end point a of the vortical seam 39, the break of the vortical seam 39 starts at point a and sequentially proceeds towards point b. As the break proceeds, the bondage between the first and second base cloths 36 and 37 is broken, and the airbag 32 deploys into a final shape that is flat in fore and aft directions, thereby exerting maximum restraining capability as indicated by the chained line shown in FIG. 6.

Additionally, the seam 39 shaped into one line instead of a V-letter shape allows a strong stress to concentrate on its inner end point a to provide a reliable breaking. In particular, since the inner end of the vortical seam 39 is oriented towards the inflator 31 in the central portion of the airbag 32, stress of the pressure of gas generated by inflator 31 can be effectively concentrated on point a thereby further ensuring a reliable breaking of seam 39. Moreover, since the seam 39 extends in a circumferential direction so as not to hinder the folding of the first and second base cloths 36 and 37, resulting in a reduced size of airbag 32 after being folded. Furthermore, the seam 39 is vortical without direction-changing points, thus enabling a smooth breaking of the seam 39 and an accurate control of the internal pressure and deployment speed of the airbag 32.

As described above, the internal pressure, deployment speed, shape as well as the other aspects of the airbag 32 during deployment can be arbitrarily controlled to effectively restrain passengers, by sewing the first and second base cloths 36 and 37 along the vortical seam 39, and using the stress upon inflation to sequentially break the seam 39 radially from the inside to the outside. In particular, the vortical seam 39 has a generally uniform curvature without portions where the curvature abruptly changes, thus providing a smooth breaking of the seam 39, as well as an easy control of the internal pressure, deployment speed, shape and the other aspects of the airbag 32 during deployment.

Next, second and third embodiments of the present invention will be described with reference to FIGS. 7 and 8.

Figure 7:
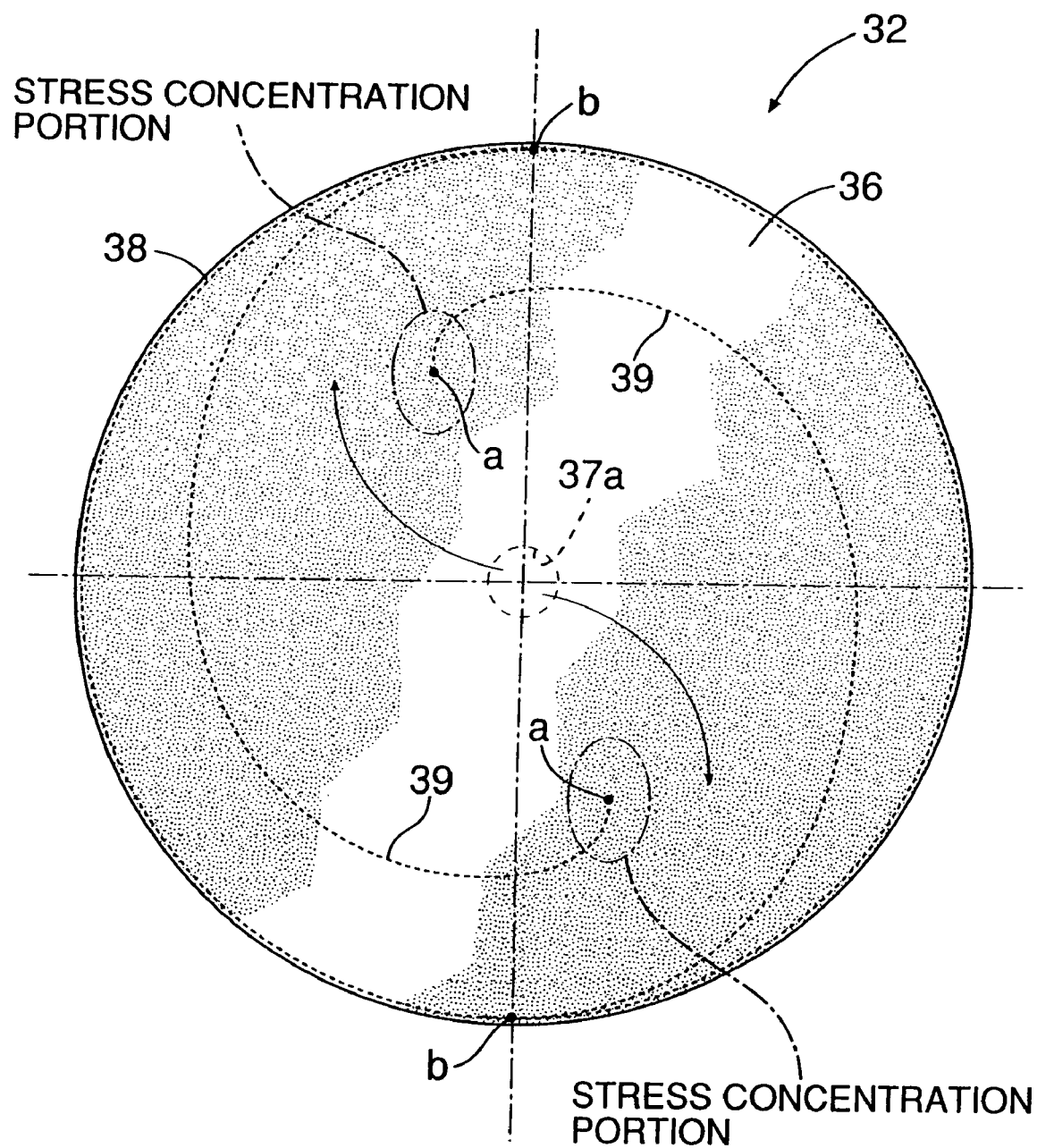
FIG. 7 is a rear view of an airbag according to a second embodiment of the present invention.
Figure 8:
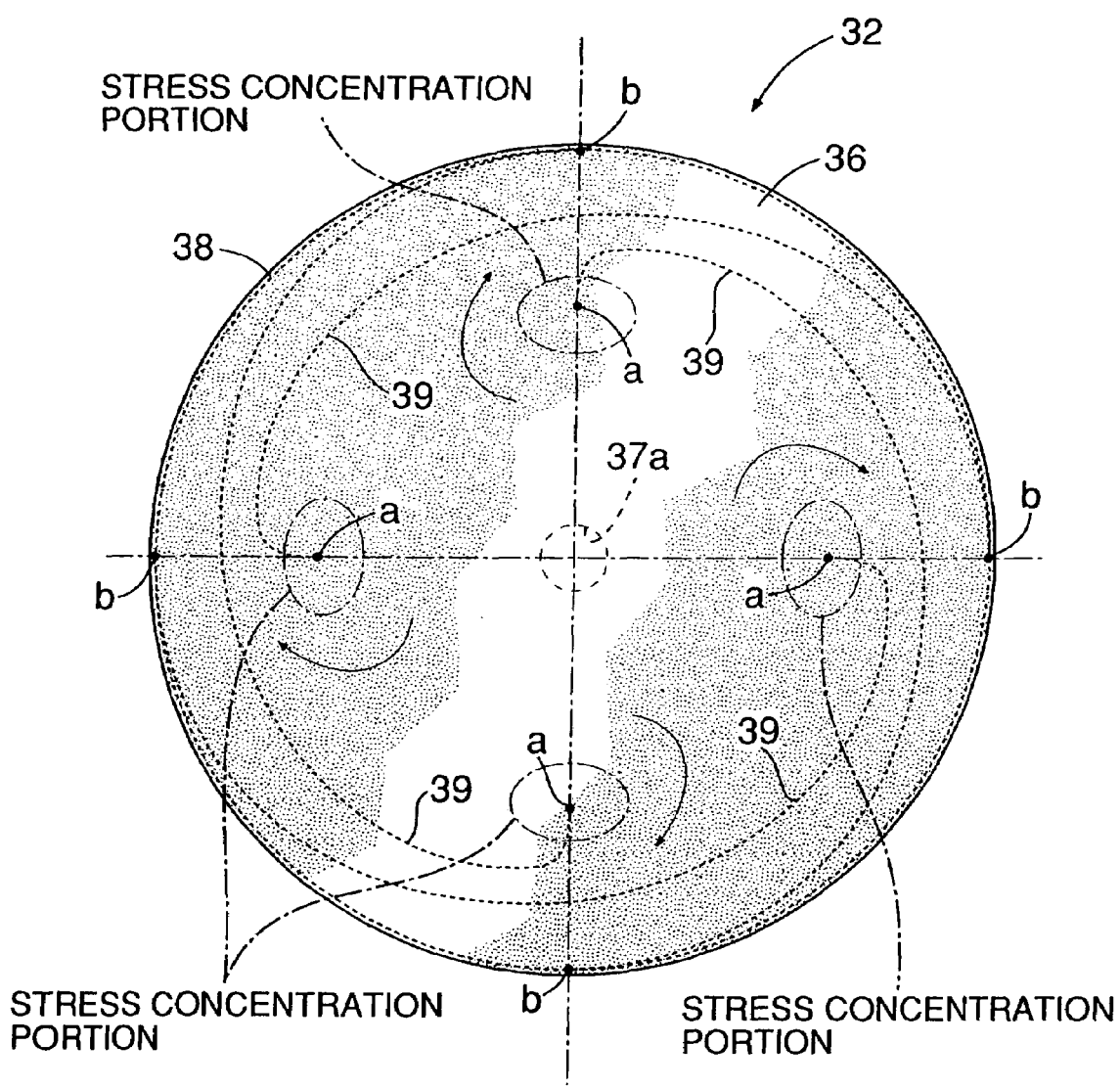
FIG. 8 is a rear view of an airbag according to a third embodiment of the present invention.

In the second embodiment shown in FIG. 7, two vortical seams 39 and 39 are set 180 degrees out of phase with each other, while in the third embodiment shown in FIG. 8, four vortical seams 39 . . . are set 90 degrees out of phase with each other. Also in the second and third embodiments, the radially inner ends points a the vortical seams 39 are oriented towards the central portion of the airbag 32, thus allowing a strong stress to concentrate on the points a so that they function as starting points of breaking.

The second and third embodiments also achieve the same effects as in the first embodiment. In addition, the internal pressure, deployment speed, shape and the other aspects of airbag 32 during deployment can be further minutely controlled, because setting or tuning of the breaking strength of each seam 39 can be individually performed.

Figure 9:
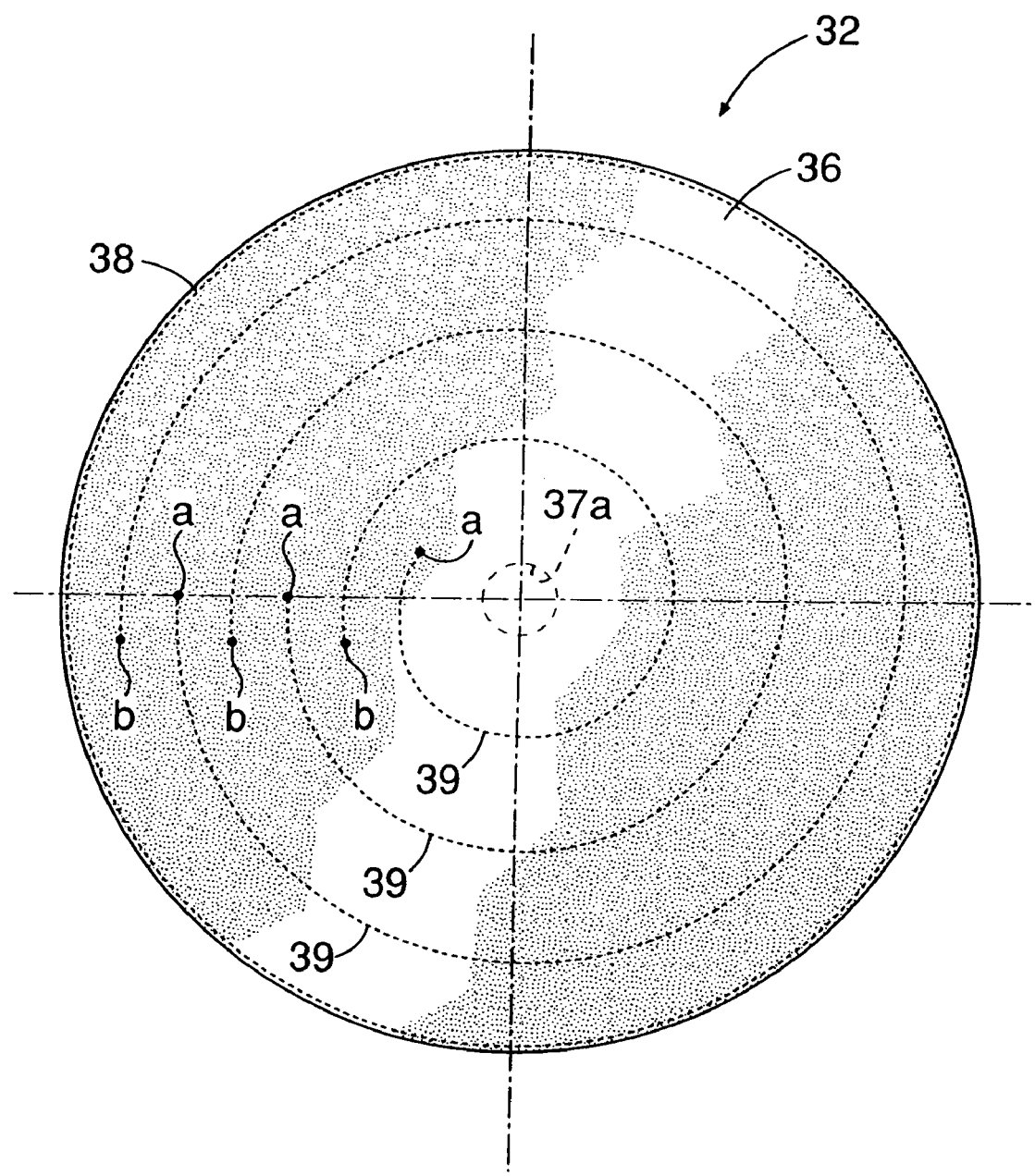
FIG. 9 is a rear view of an airbag according to a fourth embodiment of the present invention.

Next, a fourth embodiment of the present invention will be described with reference to FIG. 9.

The fourth embodiment is a variation of the first embodiment. While the vortical seam 39 is formed by a one line of sewing in the first embodiment, four vortical seams 39 having a length slightly exceeding 360 degrees are radially provided in the fourth embodiment. Although the functions of each seam 39 is the same as in the seam 39 of the first embodiment, the fourth embodiment achieve an effect in addition to those of the first embodiment, that is, effect of enhancing freedom in controlling the internal pressure, deployment speed, shape of the other aspects of the airbag 32 during deployment, by giving different seam strengths to the four seams 39, or by varying the radial distances between the four seams 39.

Figure 10:
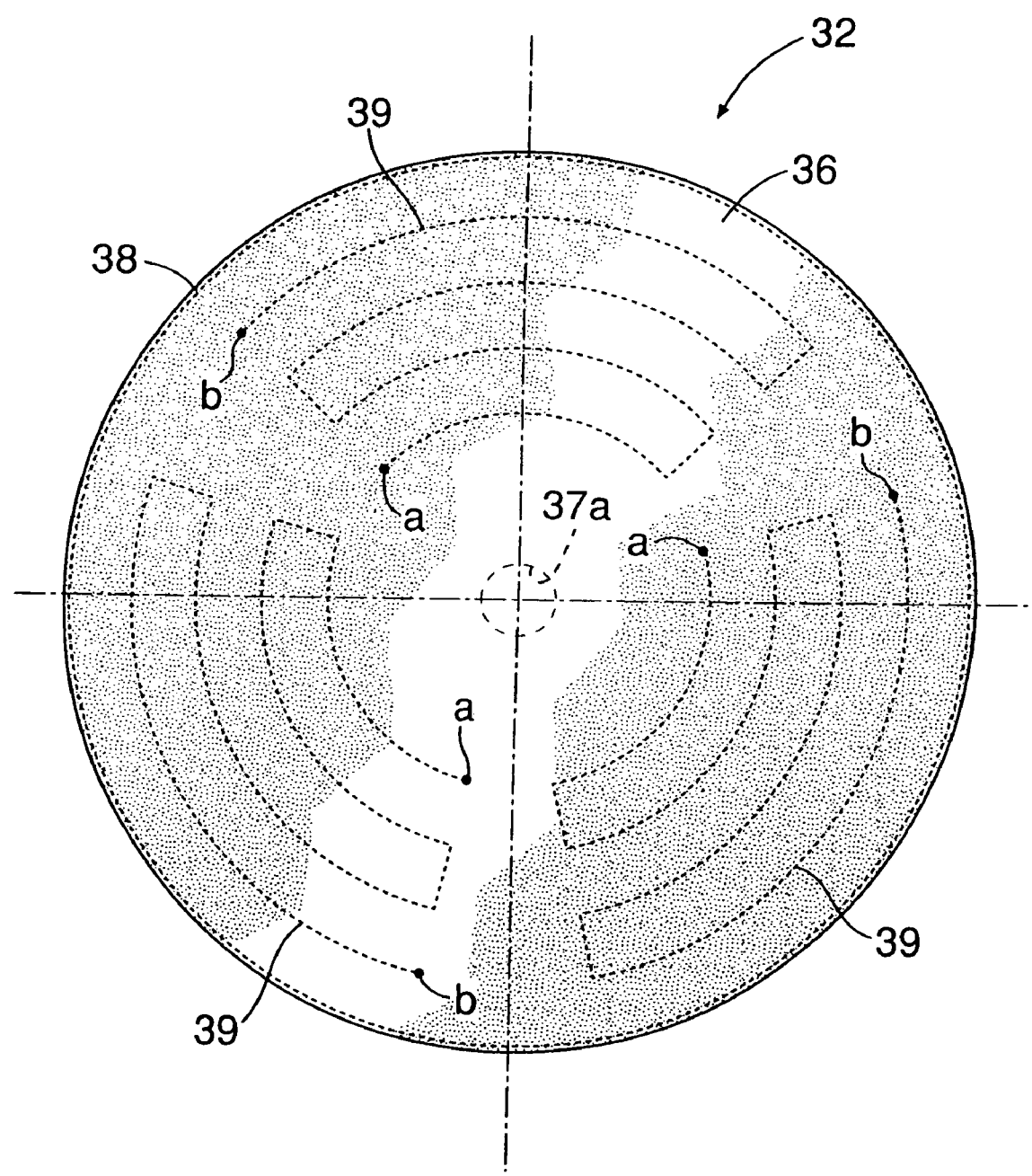
FIG. 10 is a rear view of an airbag according to a fifth embodiment of the present invention.
Figure 11:
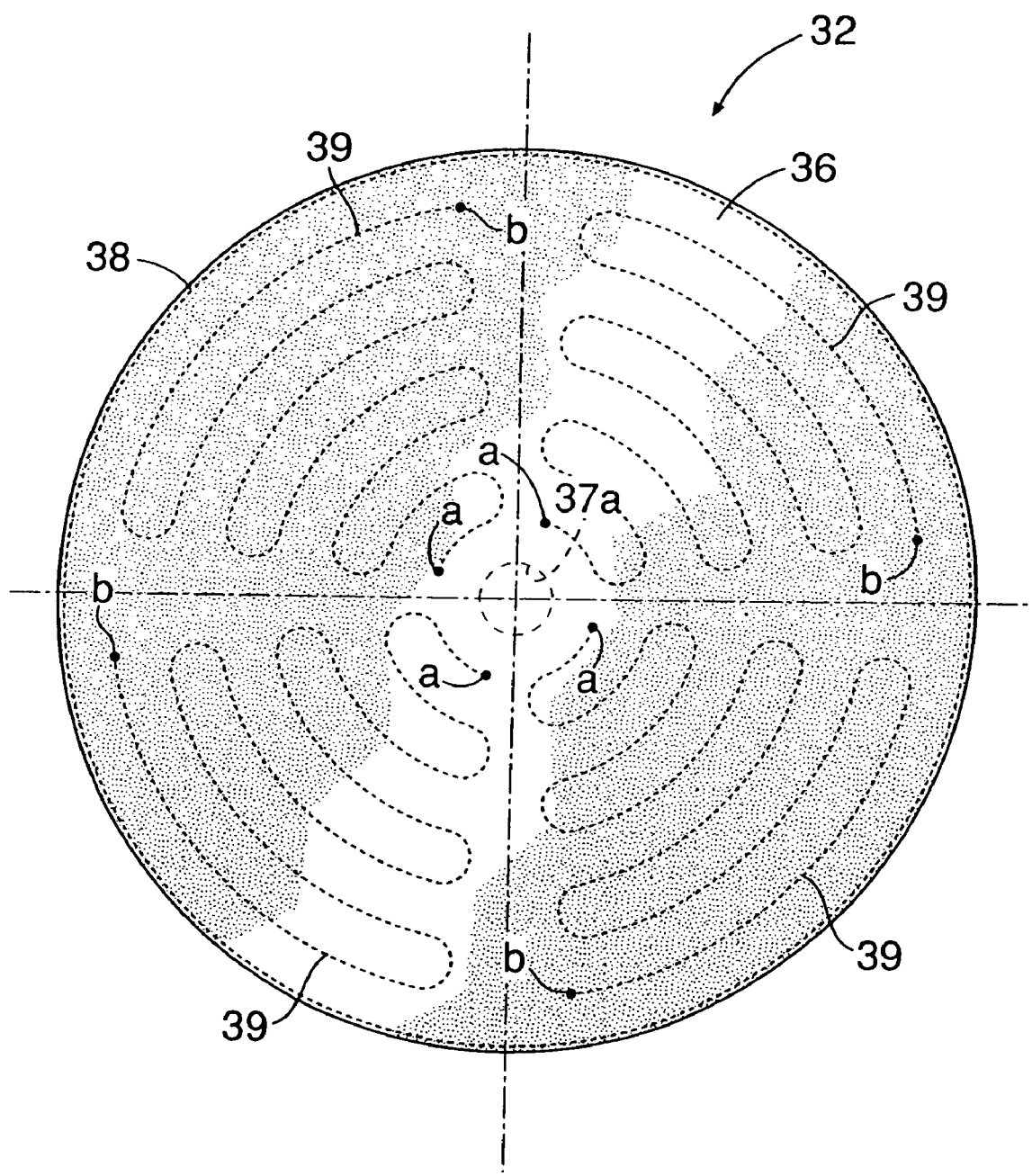
FIG. 11 is a rear view of an airbag according to a sixth embodiment of the present invention.
Figure 12:
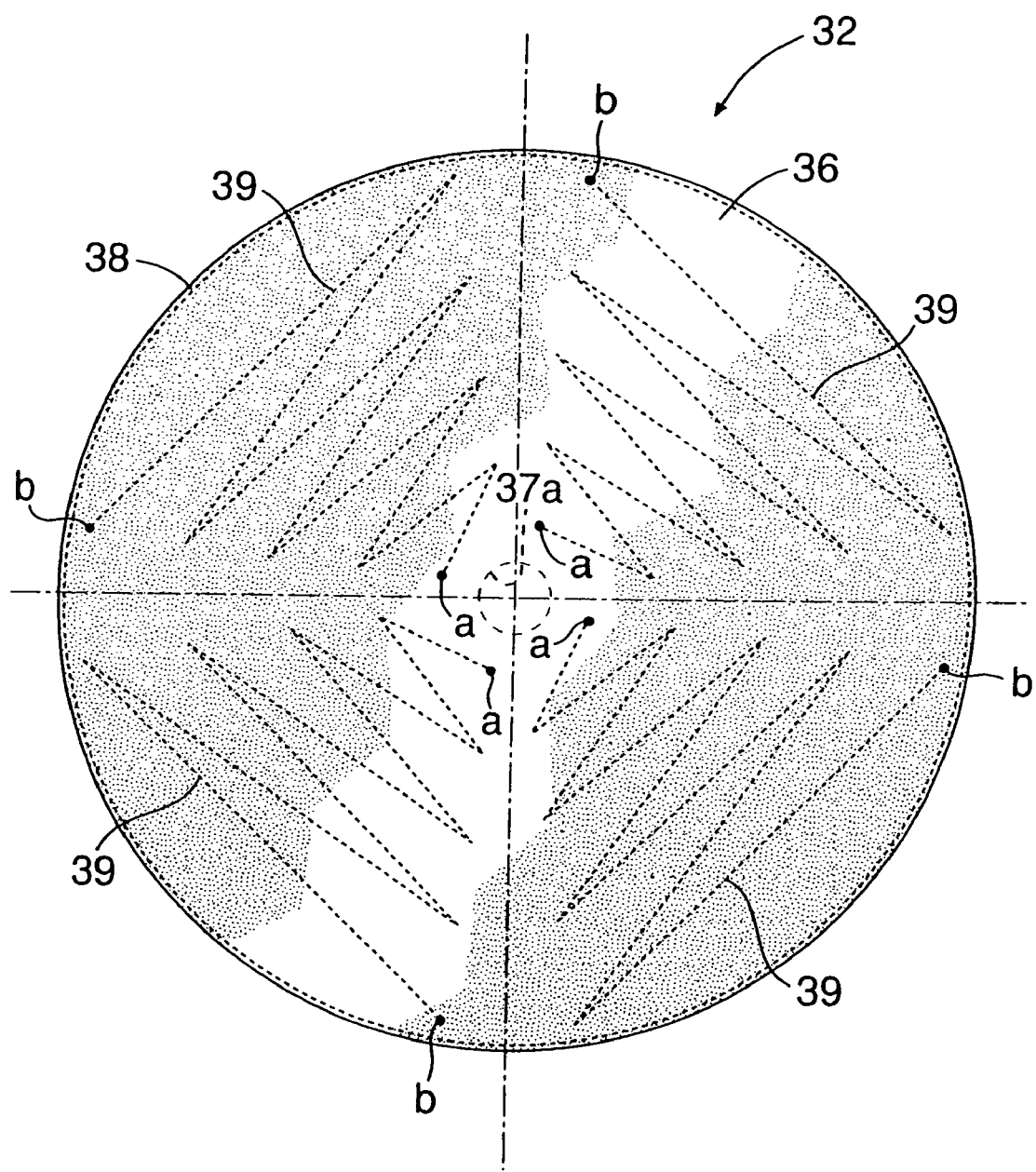
FIG. 12 is a rear view of an airbag according to a seventh embodiment of the present invention.

Next, fifth to seventh embodiments of the present invention will be described with reference to FIGS. 10 to 12.

In the first to fourth embodiments, the seams 39 are formed into a vortical shape, while in the fifth to seventh embodiments the first and second base cloths 36 and 37 are divided into a plurality (in these embodiments, three or four) of fan-like sections. In each section, switchbacking seams 39 are disposed to radially extend from the inside to the outside. In the fifth embodiment shown in FIG. 10, the three seams 39 . . . comprise alternately-disposed circular arc portions extending in a circumferential direction and straight portions extending in a radial direction. In the sixth embodiment shown in FIG. 11, the four seams 39 . . . comprise circular arc portions extending in a circumferential direction and semi-circular portions connecting adjacent circular arc portions. In the seventh embodiment shown in FIG. 12, the four seams 39 . . . comprise a plurality of zigzagging lines.

The fifth to seventh embodiments also achieve the same effects as in the first embodiment. In addition, the internal pressure, deployment speed, shape and the other aspects of airbag 32 during deployment can be further minutely controlled, because setting or tuning of the breaking strength of each seam 39 can be individually performed. Further, since the seam 39 . . . is divided into three or four parts in a circumferential direction, even when something is pressing down on one part to preventing it from breaking, the remaining parts will break to deploy the airbag 32.

Figure 13:
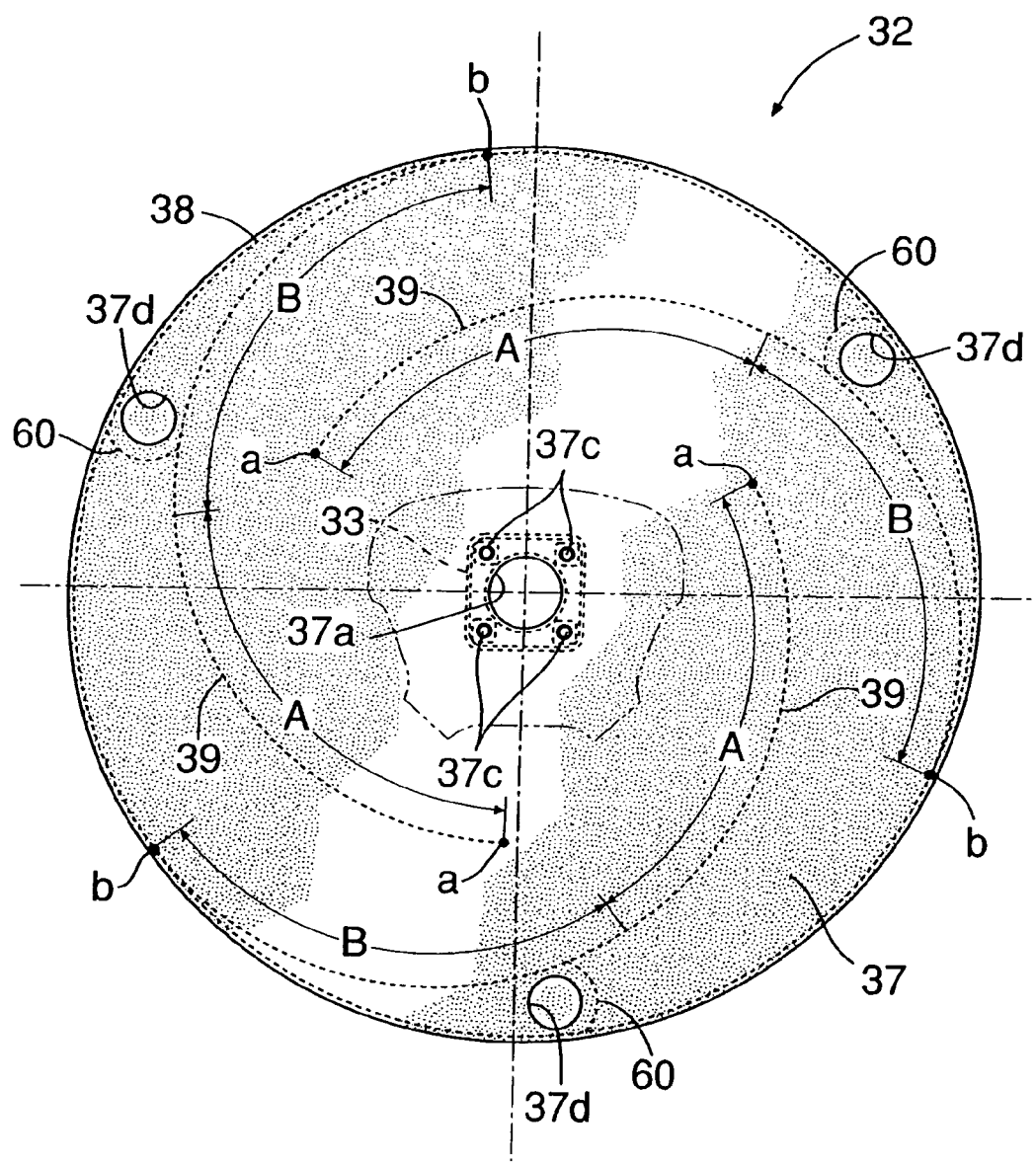
FIG. 13 is a front view of an airbag according to an eighth embodiment of the present invention.
Figure 14:
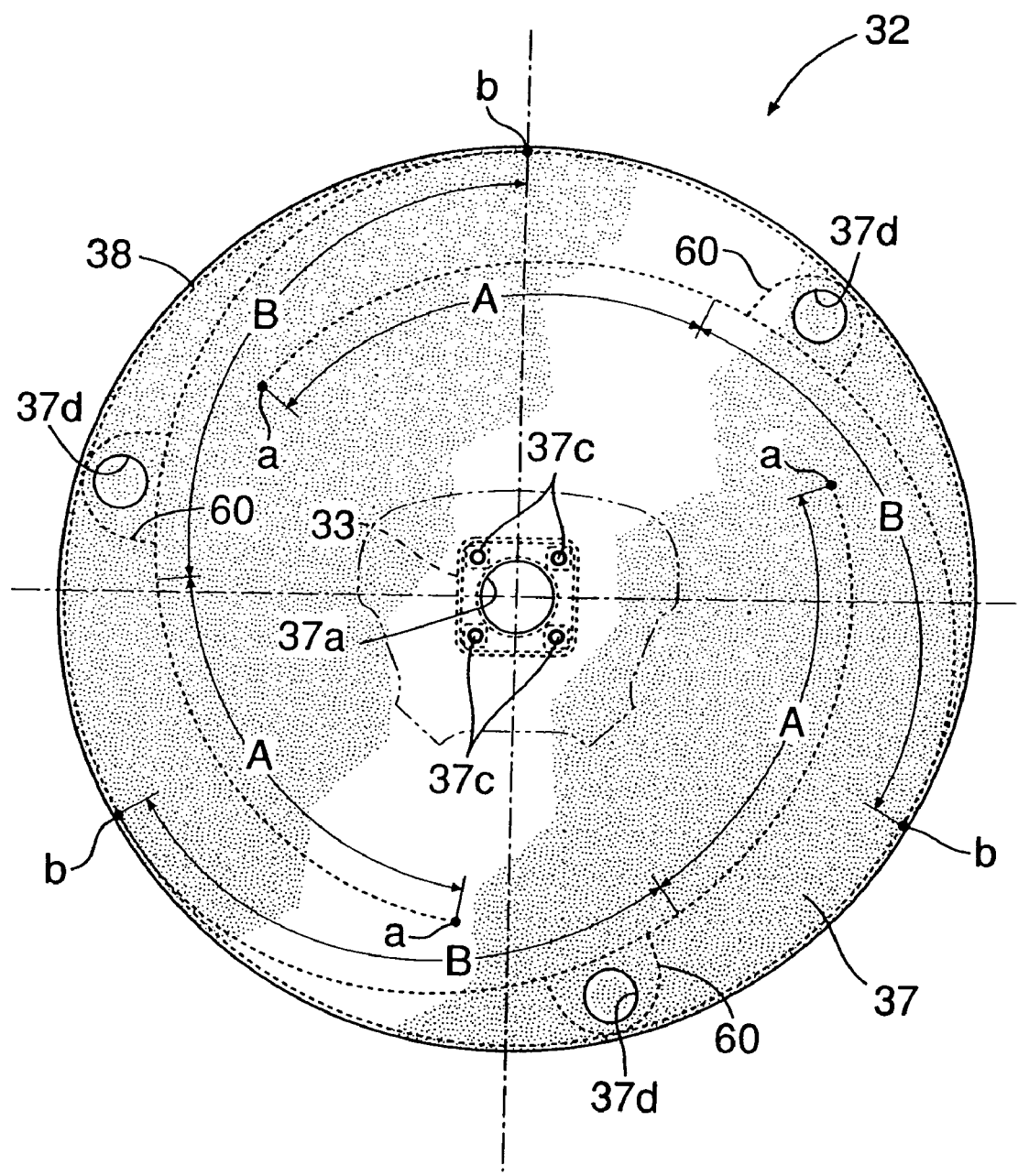
FIG. 14 is a front view of an airbag according to a ninth embodiment of the present invention.

Next, an eighth and ninth embodiments of the present invention will be described with reference to FIGS. 13 and 14.

The eighth and ninth embodiments are variations of the second and third embodiments. Three vent holes 37d . . . are formed in the vicinity of the outer periphery of the second base cloth 37 disposed in front of the airbag 32. These vent holes 37d . . . are disposed at a location surrounded by the outer peripheral seam 38 of the first and second base cloths 36 and 37, the three vortical seams 39 . . . , and the fragile auxiliary seams 60 . . . which connect both the seams 38 and 39 . . . . The only difference between the eighth and ninth embodiments is the shape of the auxiliary seams 60 . . . added for surrounding the vent holes 37d . . . , and the effects are the same.

In addition to the effects of the second and third embodiments, the eighth and ninth embodiments achieve the following effects. The vent holes 37d remain closed during the initial and middle stages of deployment of the airbag 32 where the seams 39 . . . are radially broken from the inside to the outside; and are opened at the final stage of deployment when the auxiliary seams 60 . . . are broken accompanying the breaking of the seam 39 . . . , thus discharging gas to prevent an excessive increase of the internal pressure of the airbag 32. In addition, the timing of opening the vent holes 37d . . . can be arbitrarily controlled by placing the vent holes 37d . . . either radially inside or outside the seam 39 . . . , thereby further minutely controlling the internal pressure of the airbag 32.

In the eighth and ninth embodiments, when the inflator 31 is ignited in two stages, the internal pressure of the airbag 32 . . . can be further precisely controlled by reducing the strength of seam 39 . . . at a radially inner portion A and increasing the strength of seam 39 . . . at a radially outer portion B, and breaking the portion A of the seam 39 . . . in front of the vent hole 27d . . . with the first ignition of the inflator 31, and breaking the portion B of seam 39 . . . which includes vent hole 27d . . . with the second ignition of the inflator 31.

For instance, even if there is an error in the timing of the breaking of portion A of seam 39 . . . with the first ignition of the inflator 31, the error in the timing for opening vent holes 27d . . . can be eliminated by timely breaking the portion B of the seam 39 . . . with the second ignition of the inflator 31 so that the error is compensated for. Of course, the inflator 31 can be ignited in three or more stages.

Figure 15:
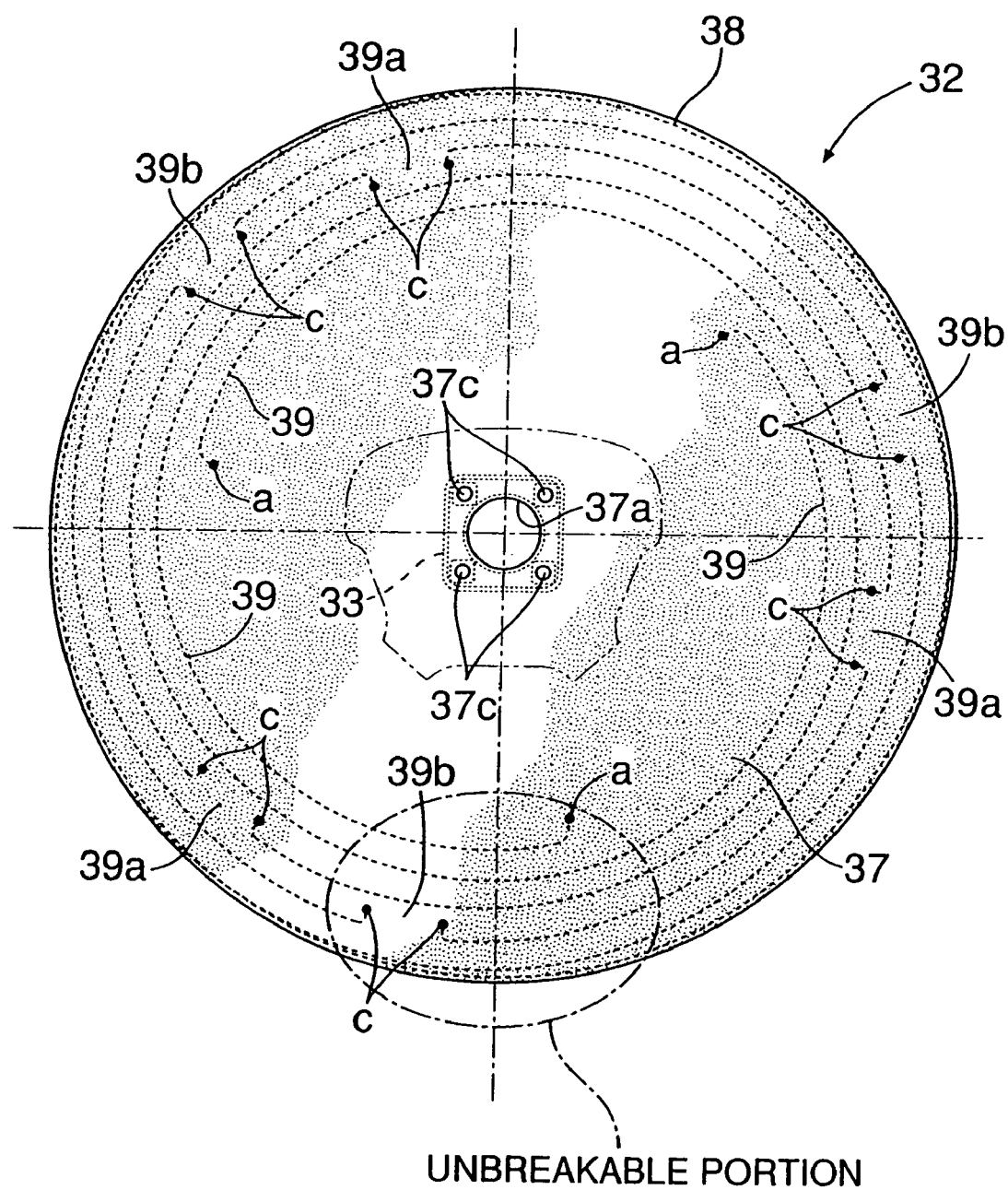
FIG. 15 is a rear view of an airbag according to a tenth embodiment of the present invention.

Next, a tenth embodiment of the present invention will be described with reference to FIG. 15.

The tenth embodiment is a variation of the first embodiment shown in FIG. 4, and comprises three seams 39 . . . which sew together the superimposed first and second base cloths 36 and 37 in a vortical shape. Each seam 39 has a plurality (two in this embodiment) of non-sewn portions 39a and 39b at which sewing is interrupted. The end of seam 39 . . . , point c, which continues into the non-sewn portions 39a and 39b is oriented towards the central portion of the airbag 32. The circumferential position of at least one of the two non-sewn portions 39a and 39b (in this embodiment the radially inner non-sewn portion 39a) is misaligned in a circumferential direction from the radially inner end portion point a of the seam 39 . . . .

Therefore, even if a unbreakable portion encircled by a chained line is pressed by something during the deployment of the airbag 32, and breaking which has started at the radially inner end point a of vortical seam 39 . . . terminates at a non-sewn portion, a new breaking starts at point c facing the two non-sewn portions 39a and 39b of seam 39 . . . in clockwise and counterclockwise directions, ultimately breaking the entire seam 39 . . . except the non-sewn portions, thus deploying most parts of the airbag 32 to exhibit passenger-restraining capability. In this process, since the point c facing the two non-sewn portions 39a and 39b of seam 39 . . . is oriented towards the central portion of the airbag 32 as is the radially inner end point a of seam 39 . . . , a strong stress can be concentrated thereon to ensure a reliable start of breaking.

Also, since the circumferential position of at least one of the two non-sewn portions 39a and 39b (in this embodiment the radially inner non-sewn portion 39a) is misaligned in a circumferential direction from the radially inner end point a corresponding to the seam 39 . . . , it is possible to prevent situations where the point a and the plurality of the points c are all included in the unbreakable portions, thus disabling breaking of the seam 39 . . . .

Next, an eleventh embodiment of the present invention will be described with reference to FIG. 16.

The eleventh embodiment is a variation of the second embodiment shown in FIG. 7, wherein two vent holes 37d and 37d are formed on the second base cloth 37 among the superimposed first and second base cloths 36 and 37, and a predetermined number (two in this embodiment) of fragile portions 38a and 38a are formed at the outer peripheral seam 38 of the first and second base cloths 36 and 37. The fragile portions 38a and 38a are sewn using a thread finer than the other portions of the seam 38 for easier breaking.

Thus, even if the two vent holes 37b and 37b remain closed for some reason and are unable to exhibit their functions at the final stage of deployment of the airbag 32, when the internal pressure of the airbag 32 reaches or exceeds a predetermined level, the fragile portions 38a and 38a of the seam 38 break and an aperture formed thereon functions as a vent hole to discharge the gas, thus preventing an excessive increase of the internal pressure of the airbag 32.

Figure 17:
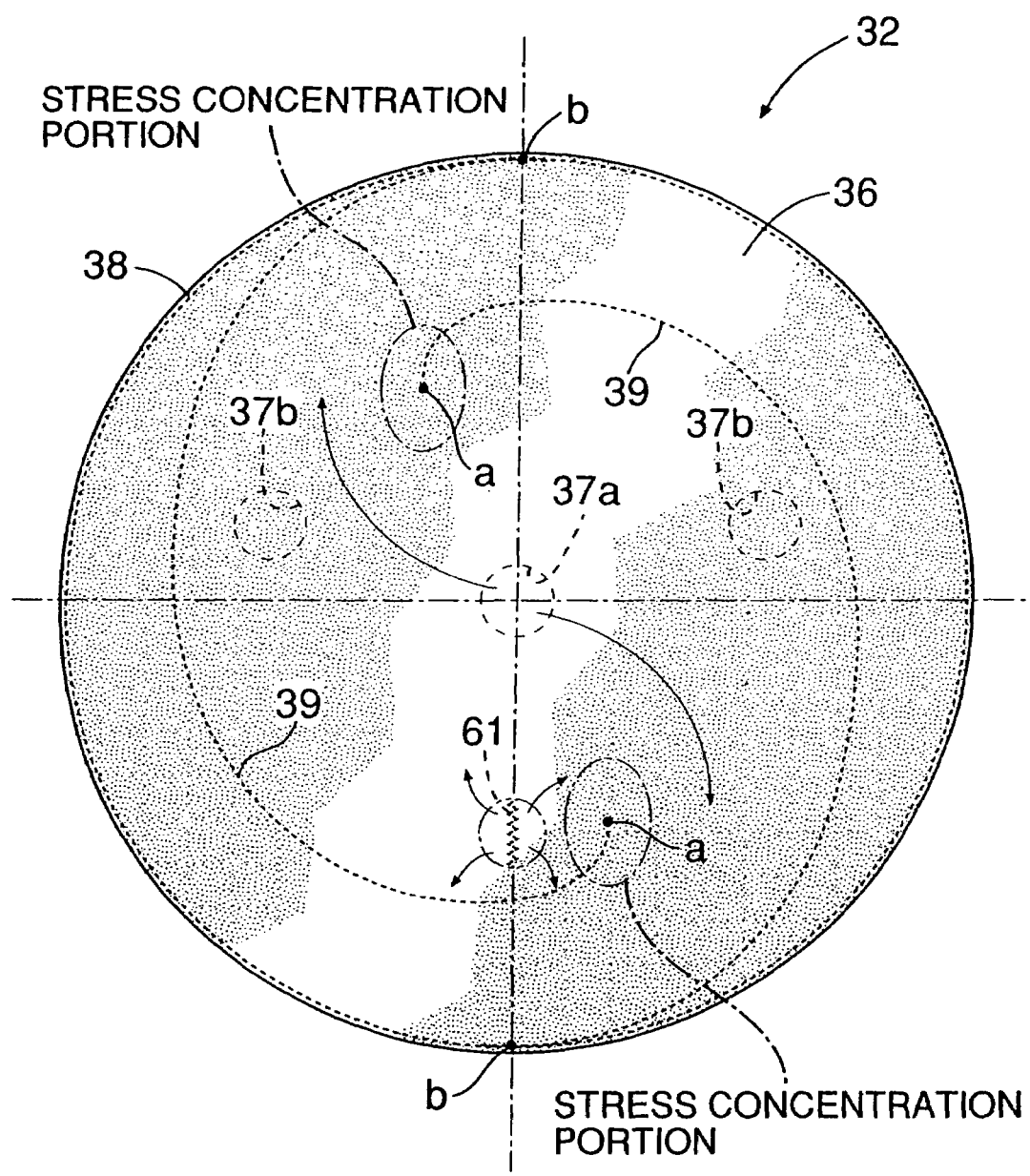
FIG. 17 is a front view of an airbag according to a twelfth embodiment of the present invention.

Next, a twelfth embodiment of the present invention will be described with reference to FIG. 17.

Figure 16:
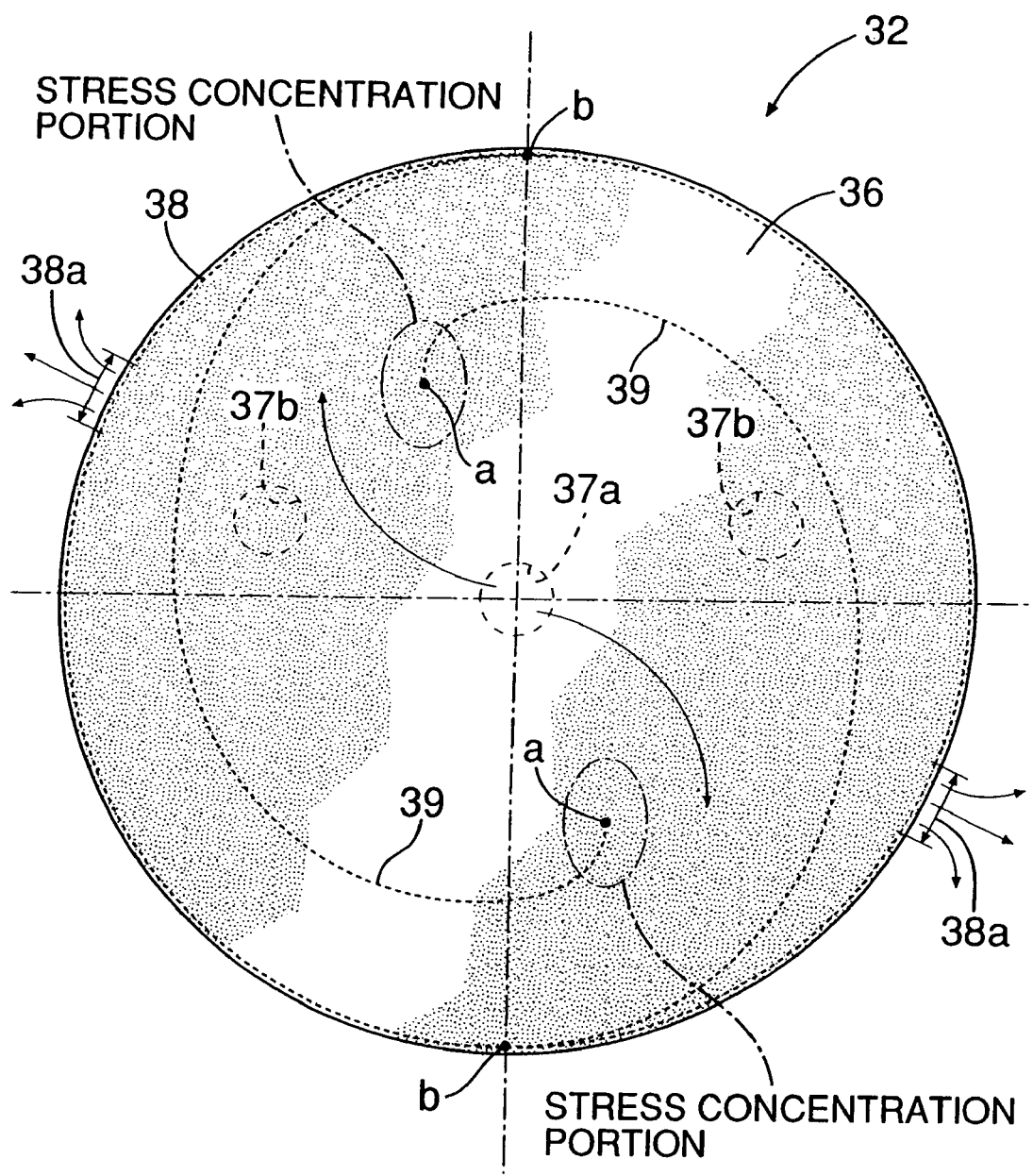
FIG. 16 is a front view of an airbag according to an eleventh embodiment of the present invention.

The twelfth embodiment is further a variation of the eleventh embodiment shown in FIG. 16. While the fragile portions 38a and 38a are formed on the seam 38 in the eleventh embodiment, a fragile portion 61 sewn so as to close a slit linearly cut into the second base cloth 37 is formed in the twelfth embodiment. The breaking strength of the fragile portion 61 is set to be higher than that of the seams 39 and 39, at the same time lower than that of the seam 38.

Thus, even if the two vent holes 37b and 37b remain closed for some reason and are unable to exhibit their functions at the final stage of deployment of the airbag 32, when the internal pressure of the airbag 32 reaches or exceeds a predetermined level, the fragile portion 61 breaks and an aperture formed thereon functions as a vent hole to discharge the gas, thus preventing an excessive increase of the internal pressure of the airbag 32.

Figure 18:
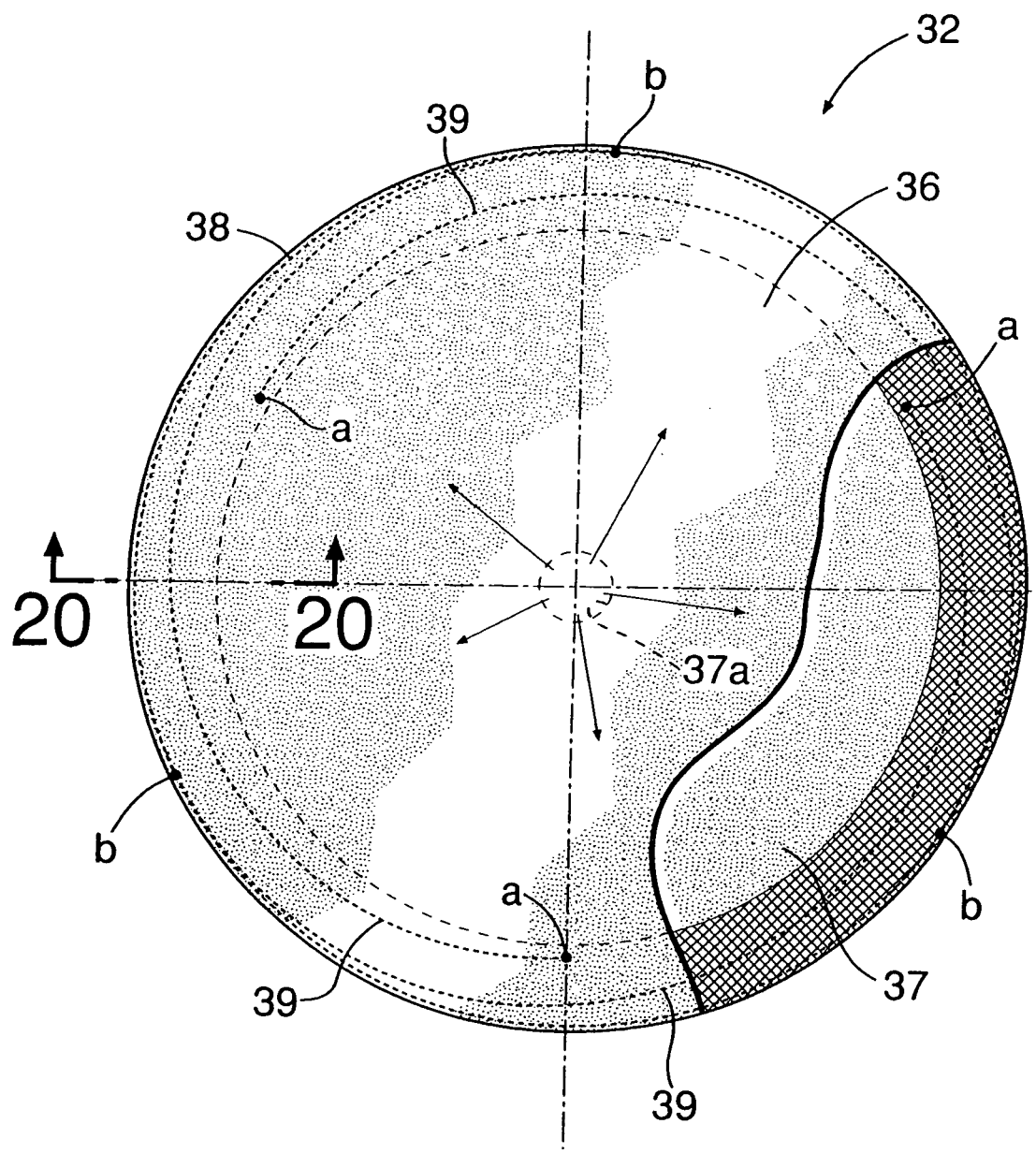
FIGS. 18 to 20 show a thirteenth embodiment of the present invention.

Next, a thirteenth embodiment of the present invention will be described with reference to FIGS. 18 to 20.

The superimposed first and second base cloths 36 and 37 are sewn together by three vortical seams 39 . . . which start from point a near the center, to point b in the outer periphery, and set 120 degrees out of phase with each other. While the outer peripheral seam 38 is firmly sewn by using a thicker thread to prevent breaking upon inflation of the airbag 32, the vortical seam 39 . . . are fragilely sewn by using a finer thread to facilitate breaking upon inflation of the airbag 32. In addition, in the section where the first and second base cloths 36 and 37 are sewn by three vortical seams 39, that is, the annular section having a predetermined width at the outer periphery of the airbag 32, the first and second base cloths 36 and 37 are adhered to each other by an adhesive 70 (refer to FIG. 20). In FIG. 18, hatching indicates the section where the first and second base cloths 36 and 37 are bonded together by adhesion.

Thus, when an acceleration exceeding a predetermined value is detected upon collision of the vehicle, the inflator 31 is ignited to generate gas that starts the inflation of the folded airbag 32. The tear line 19a of the rear cover 19 breaks when receiving pressure from the inflating airbag 32 to form an aperture, through which the airbag 32 deploys into the vehicle compartment.

Figure 19:
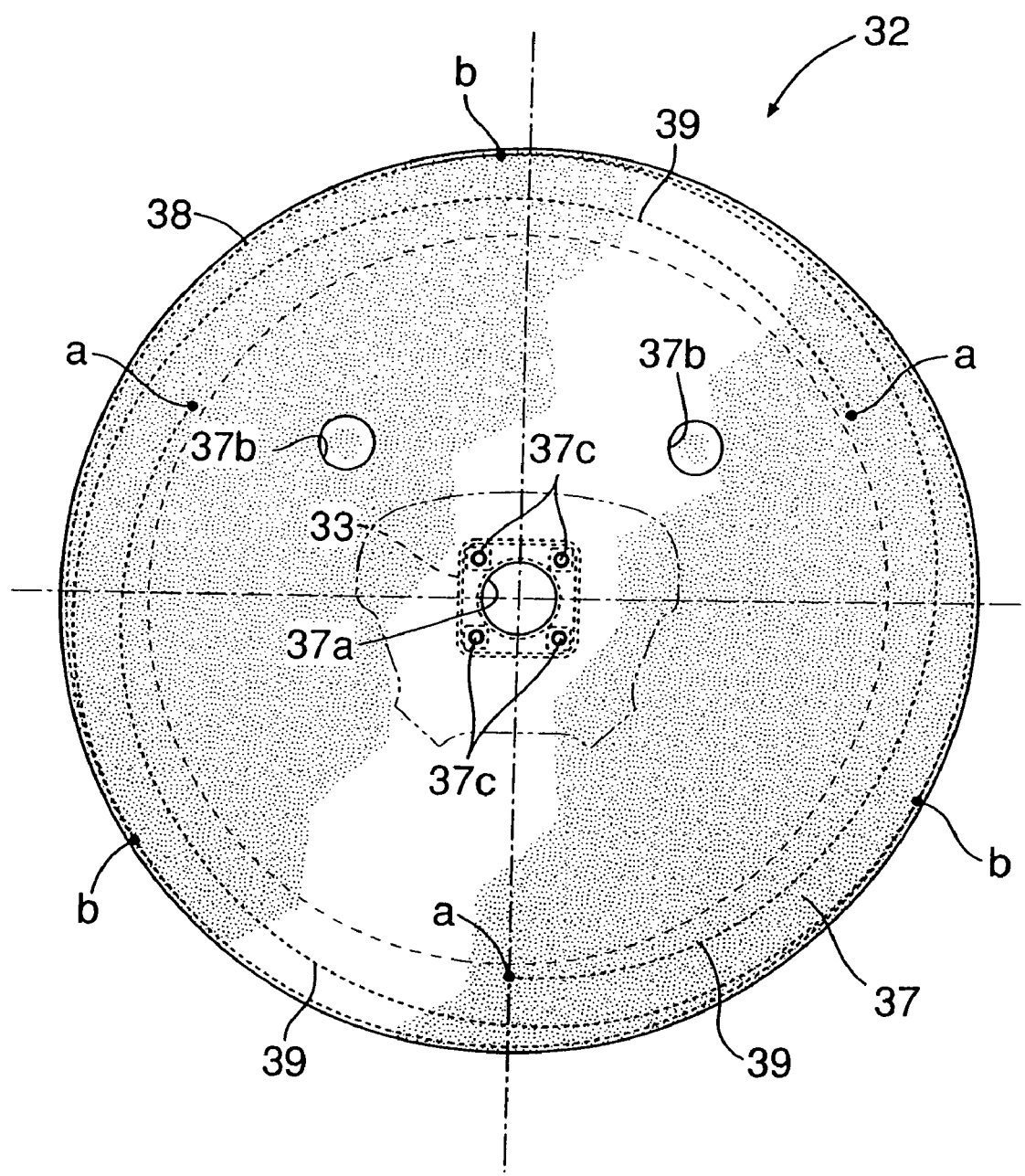
Figure 20:
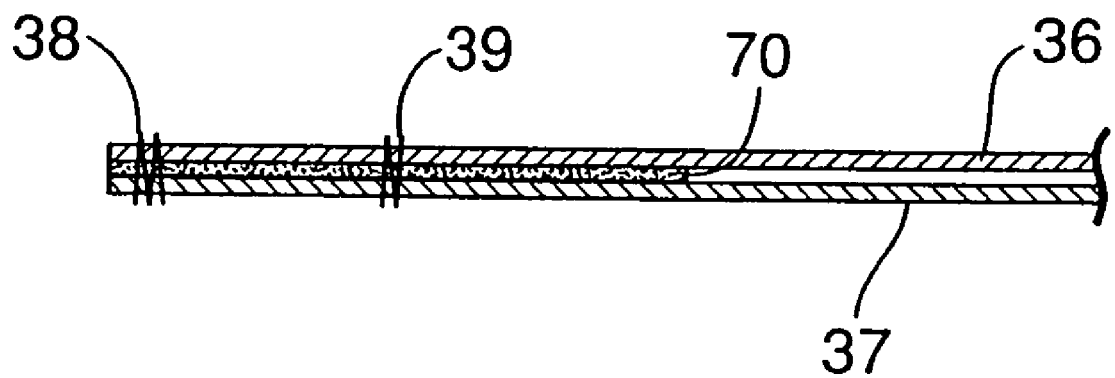

As shown in FIGS. 19 and 20, because the first and second base cloths 36 and 37 are integrally bonded by the vortical seam 39 . . . , sudden inflation of the airbag 32 in fore and aft directions during inflation of the airbag 32 is prevented, thus enabling a soft restraining of the passenger. During inflation, because a strong stress is concentrated on the inner end point a of the vortical seam 39 . . . , the breaking of the seam 39 . . . starts at point a and sequentially proceeds towards point b. Accompanying the breaking proceeds, the bondage between the first and second base cloths 36 and 37 are broken, so that the airbag 32 deploys into a final shape that is flat in fore and aft directions, thereby exerting the maximum restraining force.

Since the first and second base cloths 36 and 37 are adhered together at the annular section corresponding to the seam 39 . . . , not only gas leakage is prevented by the adhesive 70 filling the thread holes of the seam 39 . . . , but also damage received by the first and second base cloths 36 and 37 at time of break is alleviated by lowering the breaking strength of the seam 39 . . . , while delaying the breaking at the seam 39 by adhesion force of the adhesive 70 to increases the internal pressure of the airbag 32. Although it is difficult to set the breaking strength and breaking start point only by the adhesive 70, combination of the adhesive 70 with the seam 39 facilitates the setting of the breaking strength and breaking start point, thus enabling a precise control of the internal pressure in the process of deployment of the airbag 32.

Moreover, in the thirteenth embodiment, the outer peripheral seams 38 of the first and second base cloths 36 and 37 are simultaneously adhered together at the annular section, thus effectively preventing gas leakage through the thread holes of the seam 38.

Figure 21:
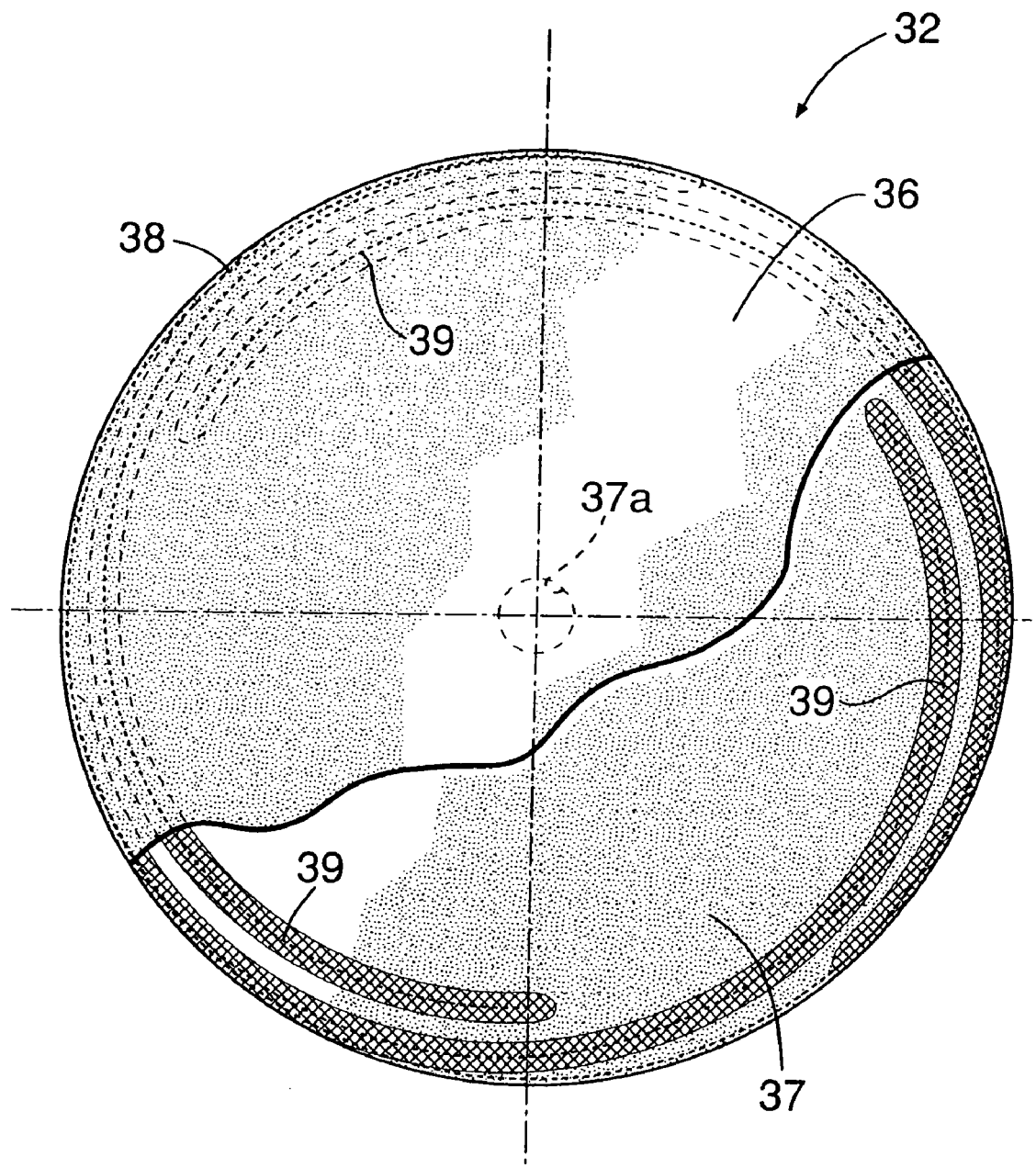
FIG. 21 is a rear view of a fourteenth embodiment.

Next, a fourteenth embodiment of the present invention will be described with reference to FIG. 21.

While the first and second base cloths 36 and 37 are adhered together at the annular section covering the three seams 39 . . . in the thirteenth embodiment, adhesion is performed only to the periphery of three seams 39 . . . (see hatched portion) in the fourteenth embodiment.

As described above, by adhesion only to the periphery of the three seams 39 . . . , the gas penetrates into the gaps between the seam 39 . . . (i.e. bonding portion) and attempts to push and separate the first and second base cloths 36 and 37, thereby ensuring a further reliable breaking of the seam 39 . . . .

Figure 22:
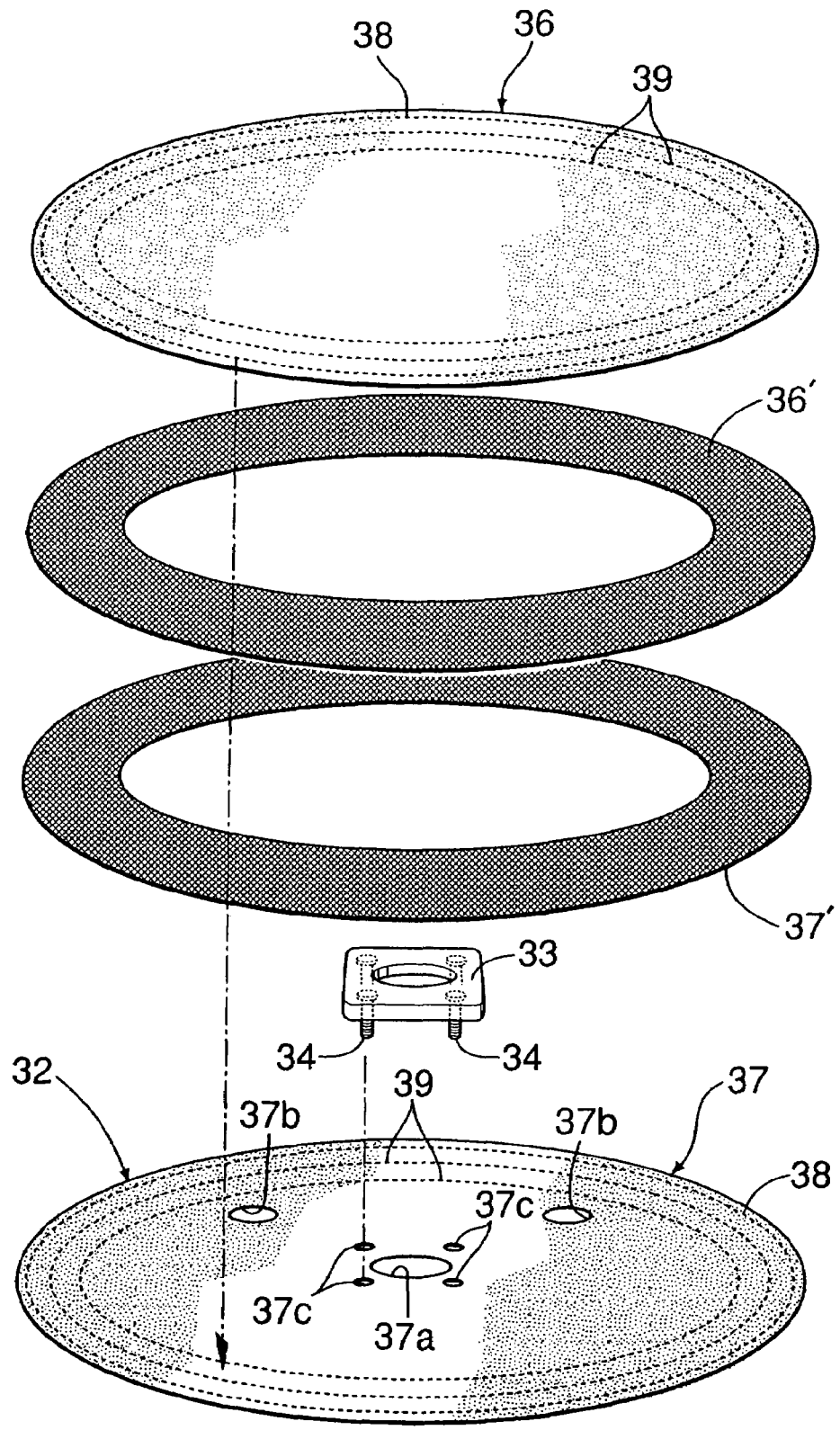
FIG. 22 is an exploded perspective view of an airbag according to a fifteenth embodiment.

Next, a fifteenth embodiment of the present invention will be described with reference to FIG. 22.

While the airbag 32 consists of first and second base cloths 36 and 37 in the thirteenth and fourteenth embodiments, the airbag 32 in the fifteenth embodiment comprises annular third and fourth base cloths 36' and 37' that are sandwiched between the outer peripheral portions of the first and second base cloths 36 and 37. The third base cloth 36' is firmly adhered to the inner face of first base cloth 36 so as to avoid detachment, and the fourth base cloth 37' is firmly adhered to the inner face of second base cloth 37 so as to avoid detachment. Then, the first base cloth 36, third base cloth 36', fourth base cloth 37' and second base cloth 37 are superimposed and sewn along the seams 38, 39 and 39. In this process, the third base cloth 36' and the fourth base cloth 37' are adhered together by a relatively detachable adhesive.

According to this fifteenth embodiment, in addition to the effects of the thirteenth embodiment, there is provided a further enhanced gas leakage prevention effect by reinforcement of the first base cloth 36 by the third base cloth 36' and reinforcement of the second base cloth 37 by fourth base cloth 37' to further reliably prevent damage to the seams of the first and second base cloths 36 and 37.

Although the seams 39 and 39 are concentrically formed in the fifteenth embodiment, they may be shaped into a vortex as in the thirteenth and fourteenth embodiments. Also, while the third and fourth base cloths 36' and 37' are adhered to the inner faces of the first and second base cloths 36 and 37 in the fifteenth embodiment, they may be adhered to the outer sides of the first and second base cloths 36 and 37.

Figure 23:
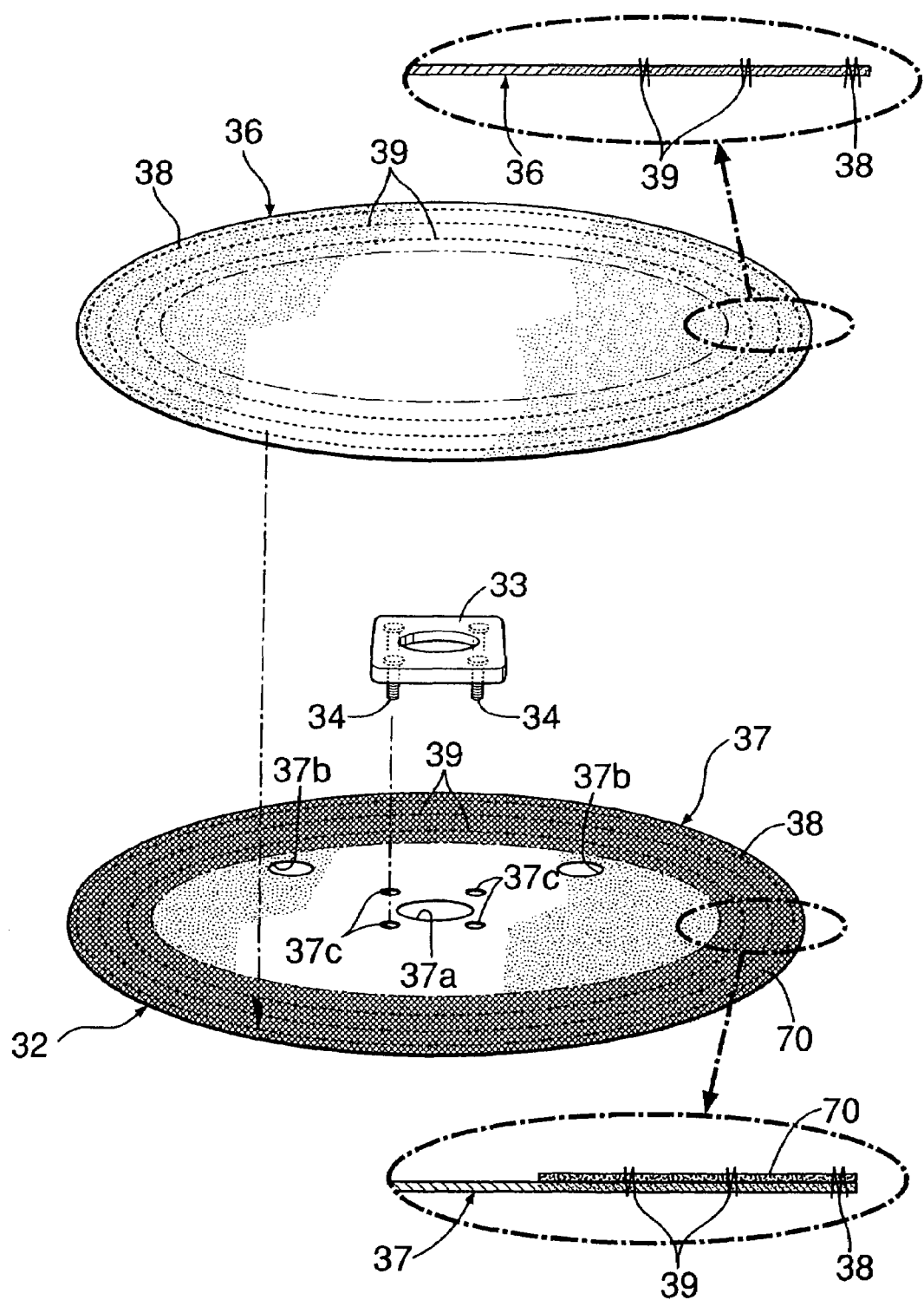
FIG. 23 is an exploded perspective view of an airbag according to a sixteenth embodiment.
Figure 24:
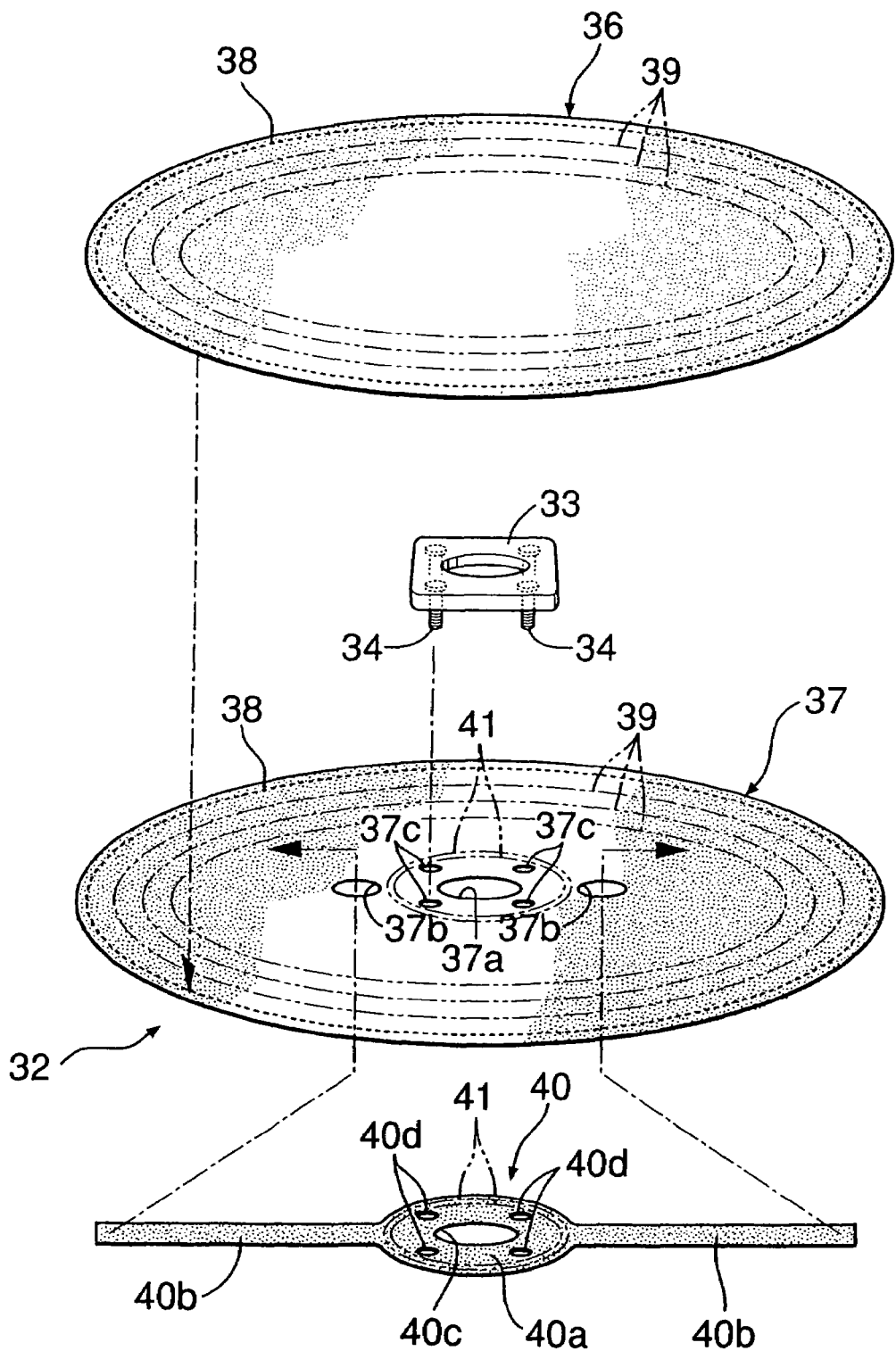
Figure 25:
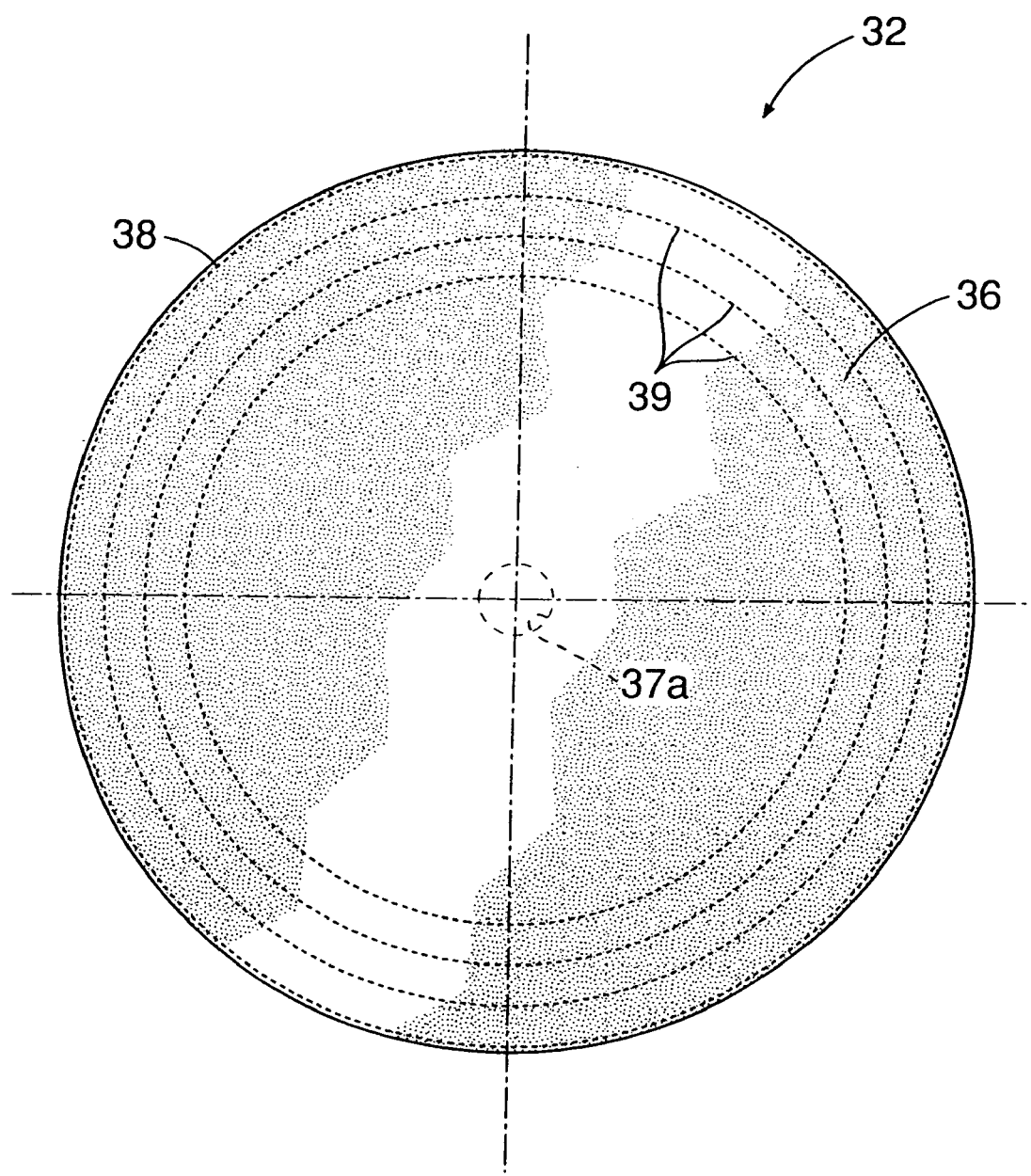

Next, a sixteenth embodiment of the present invention will be described with reference to FIG. 23.

The sixteenth embodiment is a variation of the fifteenth embodiment. While the first and second base cloths 36 and 37 are reinforced by adhesion on the third and fourth base cloths 36' and 37' in the fifteenth embodiment, in the sixteenth embodiment, an annular section (the densely hatched area in the enlarged sectional view) is woven in advance for reinforcement along the outer periphery of the first and second base cloths 36 and 37.

According to the sixteenth embodiment, the same effects as in the fifteenth embodiment can be achieved without increasing the number of components. Also in the sixteenth embodiment, the seams 39 and 39 are concentrically formed, but they may be shaped into a vortex as in the thirteenth and fourteenth embodiments.

Next, a seventeenth embodiment of the present invention will be described with reference to FIGS. 24 to 28B.

As apparent from FIGS. 24 to 27, a mounting portion 40a of an airbag cover 40 is superimposed on the outer face of the central portion of second base cloth 37 and integrally sewn at two seams 41 and 41; and two band-like portions 40b and 40b of the airbag cover 40 are inserted into the two vent holes 37b and 37b of the second base cloth 37 from the outside to the inside. Since the diameters of vent holes 37b and 37b are the same as the widths of the band-like portions 40b and 40b, the vent holes 37b and 37b are closed by the band-like portions 40b and 40b. In addition, the superimposed second base cloth 37 and the mounting portion 40a of the vent hole cover 40 are sandwiched between the rear face of the retainer 22 and the front face of the fixing ring 33 and bolted together with a bolt 34. Therefore, gas generated by the inflator 31 is supplied to the interior of airbag 32 through the aperture 37a at the center of second base cloth 37 and the aperture 40c of the vent hole cover 40.

The superimposed first and second base cloths 36 and 37 are sewn at locations close to their outer peripheries by three concentric seams 39 . . . . While the outer periphery seam 38 is firmly sewn by using a thicker thread to prevent breaking upon inflation of airbag 32, a finer thread fragilely sews the inner three concentric seams 39 . . . to facilitate breaking upon inflation of the airbag 32. In this process, the tip ends of the two band-like portions 40b and 40b extending into airbag 32 are sewn together at the three seams 39 . . . .

Thus, when an acceleration exceeding a predetermined value is detected upon collision of the vehicle, the inflator 31 is ignited to generating gas that starts the inflation of the folded airbag 32. The tear line 19a of the rear cover 19 breaks when receiving pressure from the inflating airbag 32 to form an aperture, through which the airbag 32 deploys into the vehicle compartment.

Figure 28A:
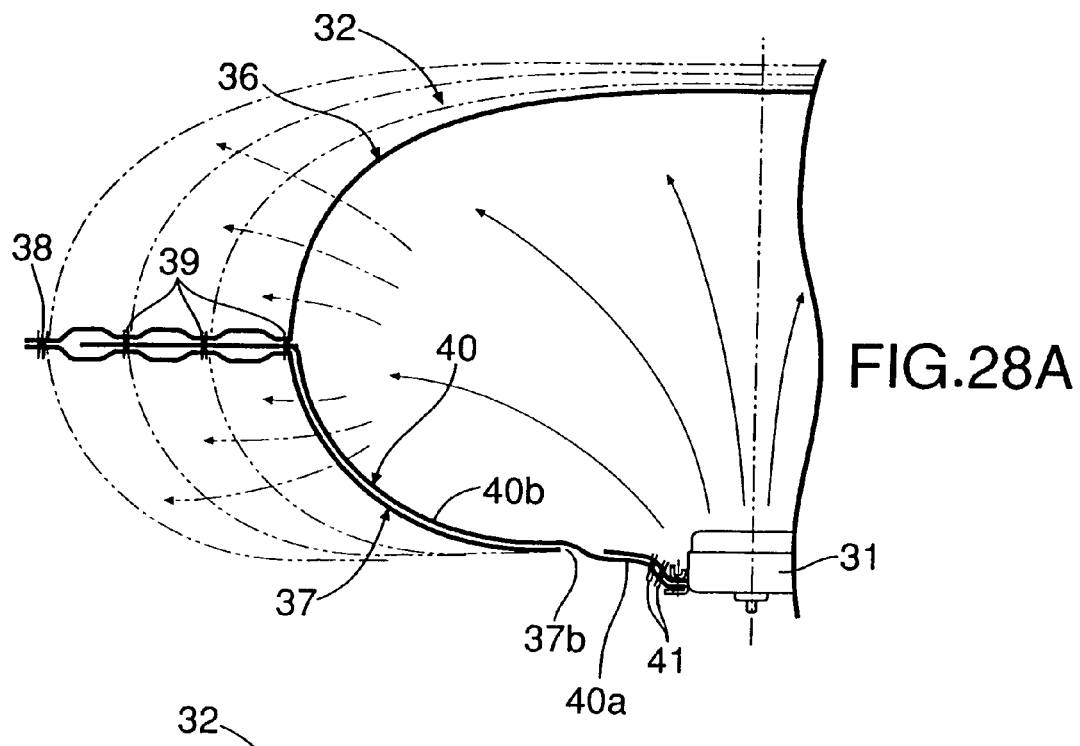

As shown in FIG. 28A, since the three seams 39 . . . integrally bond together the first and second base cloths 36 and 37, the sudden inflation of airbag 32 is prevented when the airbag 32 inflates, thus enabling a soft restraining of passengers. As the internal pressure of the airbag 32 increases, breaking of the three seams 39 . . . sequentially proceeds radially from the inside to the outside, allowing the airbag 32 to gradually increase its volume while maintaining an appropriate internal pressure and ultimately deploying into a final shape that is flat in fore and aft directions, thereby exerting a maximum restraining force.

Figure 28B:
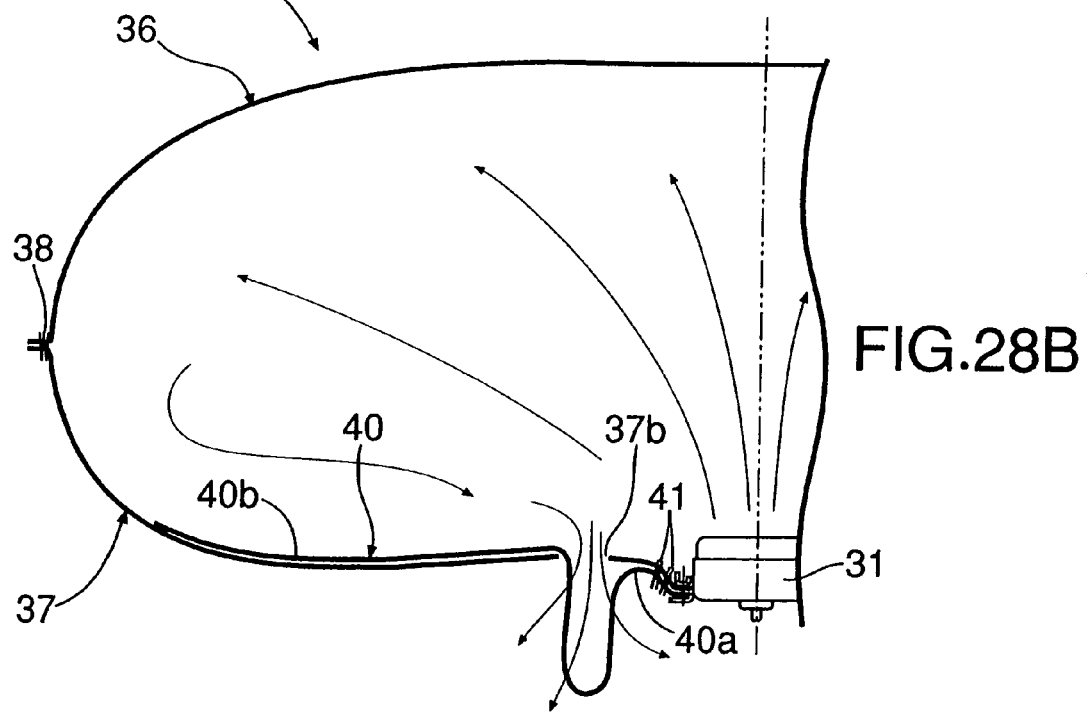

Since the other ends of the two band-like portions 40b and 40b of the vent hole cover 40 are restrained by the first and second base cloths 36 and 37 until all the three seams 39 . . . are broken, the vent holes 37b and 37b are closed by the band-like portions 40b and 40b to prevent gas leakage, thus enabling an immediate increase of the internal pressure of the airbag 32 and maintaining the internal pressure at an appropriate level. When all the three seams 39 . . . are broken at the final stage of deployment of the airbag 32, the restraints on the other ends of the two band-like portions 40b and 40b of the vent hole cover 40 are released as shown in FIG. 28B, to push portions of the band-like portions 40b and 40b of the vent hole cover 40 out from the vent holes 37b and 37b, thus opening the vent holes 37b and 37b. As a result, excess gas is discharged through the vent holes 37b and 37b, thus preventing an excessive increase of the internal pressure of the airbag 32.

While the tip ends of the two band-like portions 40b and 40b of the vent hole cover 40 are sewn together at all the three seams 39 . . . in this embodiment, the timing of the opening of vent holes 37b and 37b can be arbitrarily adjusted by sewing them to the two inner seams 39 and 39 or to the one innermost seam 39. Also, since the band-like portions 40b and 40b are arranged so that they pass through the vent holes 37b and 37b, thereby preventing misalignment of the band-like portions 40b and 40b from the vent holes 37b and 37b to thus prevent gas leakage.

Next, an eighteenth and nineteenth embodiments of the present invention will be described with reference to FIGS. 29 and 30.

Figure 29:
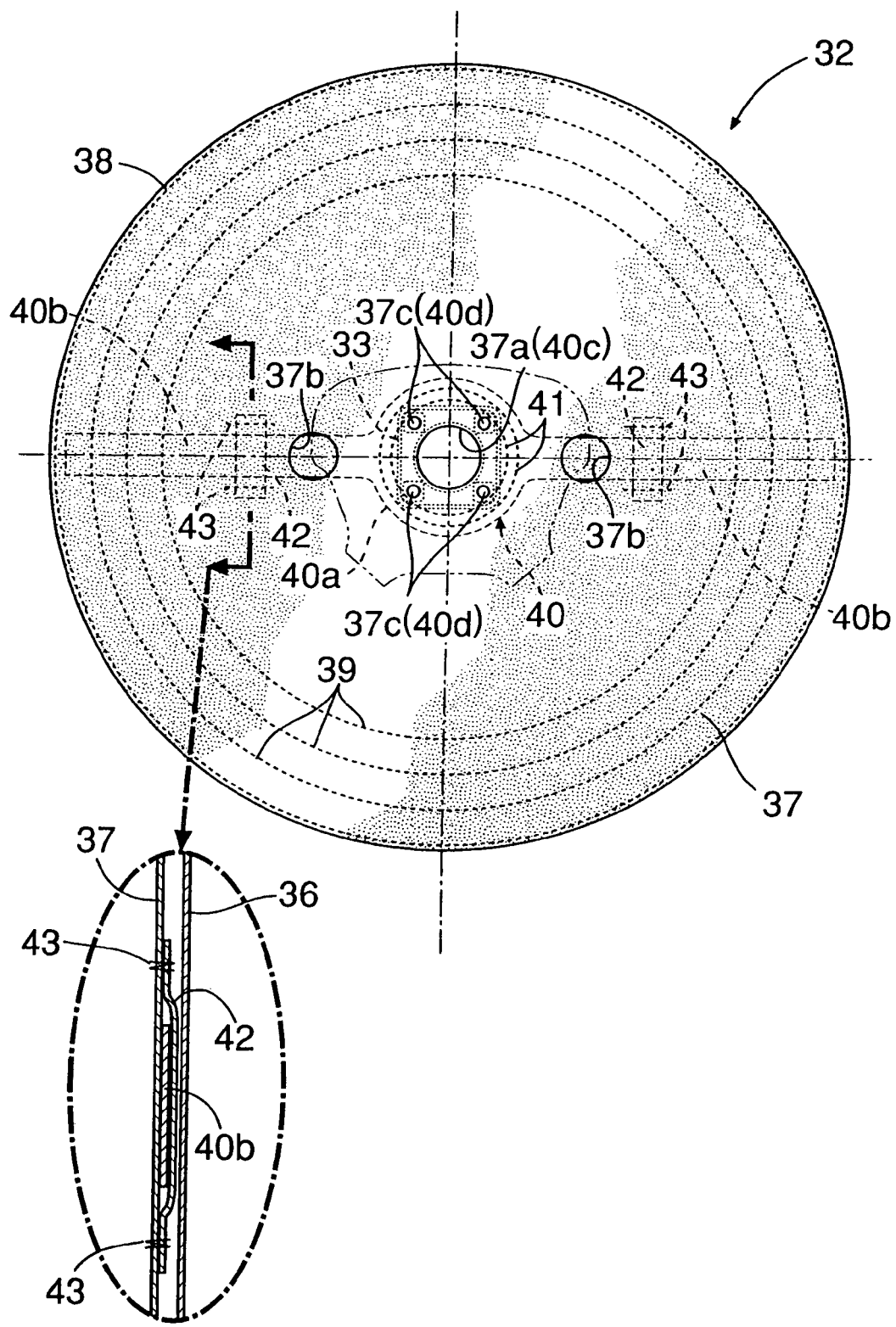
FIG. 29 is a drawing according to an eighteenth embodiment of the present invention, corresponding to FIG. 26.

In the seventeenth embodiment, the mounting portion 40a of the vent hole cover 40 is disposed outside the second base cloth 37, and the band-like portions 40b and 40b pass through the vent holes 37b and 37b to enter the inner face of second base cloth 37, while the vent hole cover 40 in the eighteenth embodiment shown in FIG. 29 is generally arranged so as to conform to the shape of the inner face of the second base cloth 37. To prevent misalignment of the band-like portions 40b and 40b of the vent hole cover 40 from the vent holes 37b and 37b, a guide member 42 that allows longitudinal sliding of the band-like portions 40b and 40b is fixed to the inner face of the second base cloth 37 by the seams 43 and 43.

Figure 30:
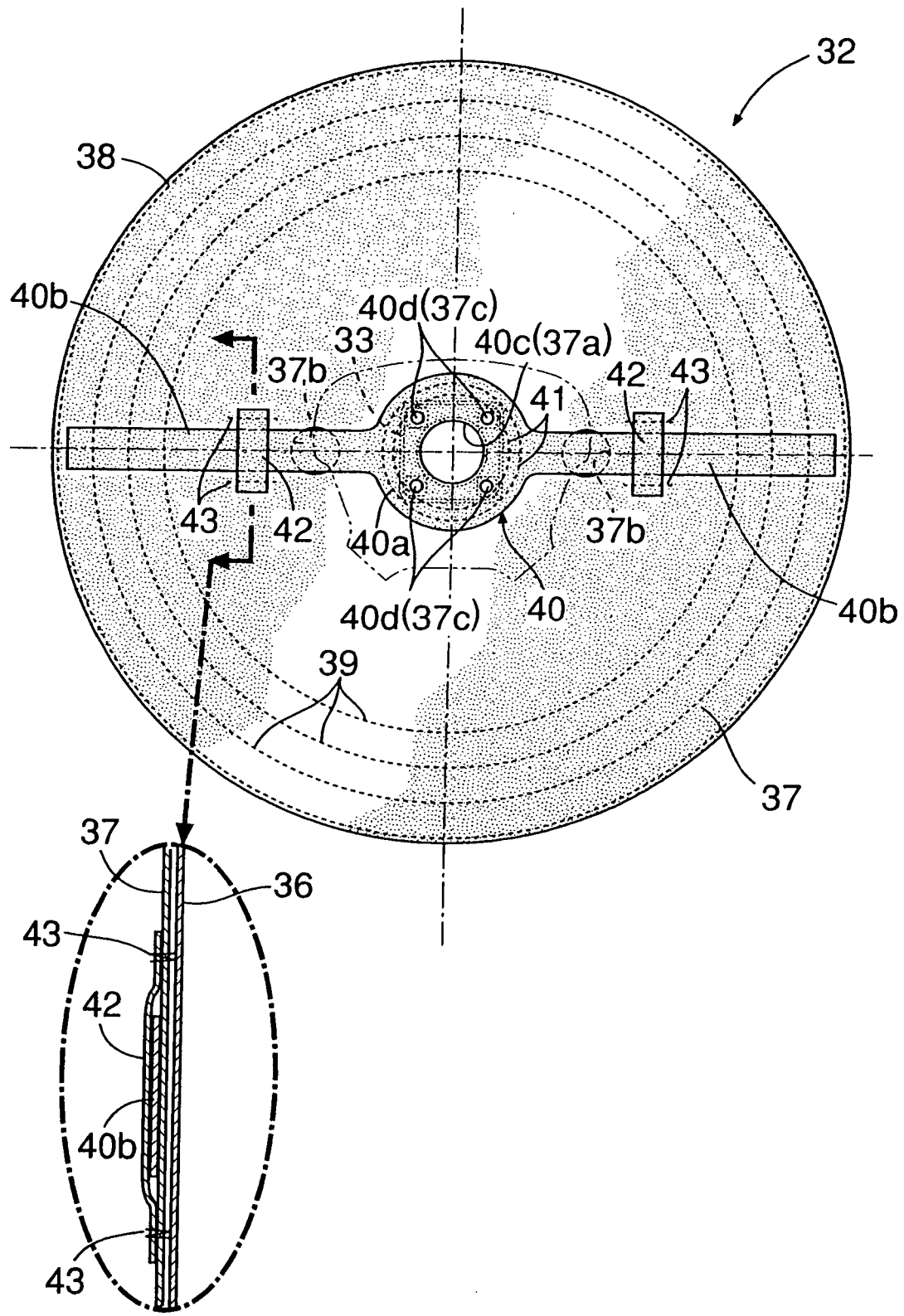
FIG. 30 is a drawing according to a nineteenth embodiment of the present invention, corresponding to FIG. 26.

Further, the vent hole cover 40 in the nineteenth embodiment shown in FIG. 30 is disposed so that it generally conforms to the shape of the outer face of the second base cloth 37, and guide members 42 that allow longitudinal sliding of the band-like portions 40b and 40b are fixed to the outer face of the second base cloth 37 by the seams 43 and 43 in order to prevent misalignment of the band-like portions 40b and 40b from the vent holes 37b and 37b.

Thus, the eighteenth and nineteenth embodiments achieve the same effects as in the seventeenth embodiment.

Figure 31:
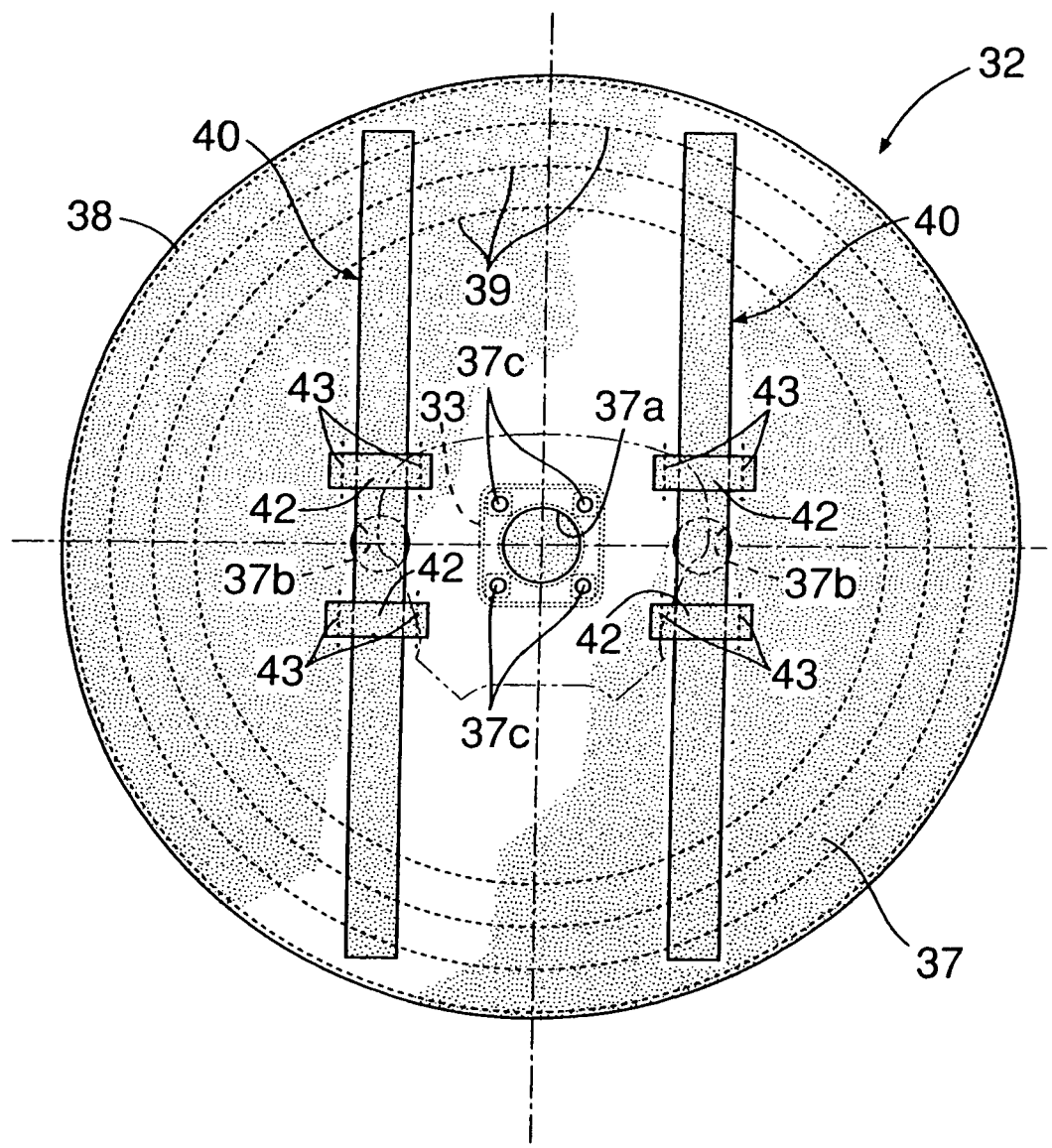
FIG. 31 is a drawing according to a twentieth embodiment of the present invention, corresponding to FIG. 26.

Next, a twentieth embodiment of the present invention will be described with reference to FIG. 31.

While the seventeenth to nineteenth embodiments include a mounting portion 40a of the vent hole cover 40 fixed to the central portion of the second base cloth 37, and tip ends of the band-like portions 40b and 40b are fixed to the outer periphery of the second base cloth 37, the twentieth embodiment features two vent hole covers 40 and 40 formed generally into a band-shape disposed parallel to each other and sandwiching the aperture 37a from opposite sides at the outer face of the second base cloth 37. Each vent hole cover 40 slidably penetrate through two guide members 42 and 42 which are fixed to the second base cloth 37 by seams 43 . . . so as to cover vent hole 37b of the second base cloth 37, while the opposite ends are sewn onto the second base cloth 37 by three breakable concentric seams 39 . . . .

Thus, this twentieth embodiment achieves the same effects as in the seventeenth embodiment described above. Moreover, the vent hole covers 40 and 40 may be disposed at the inner face of the second base cloth 37, or may be disposed to pass through the vent holes 37b and 37b with one end positioned outside and the other end positioned inside.

Figure 32:
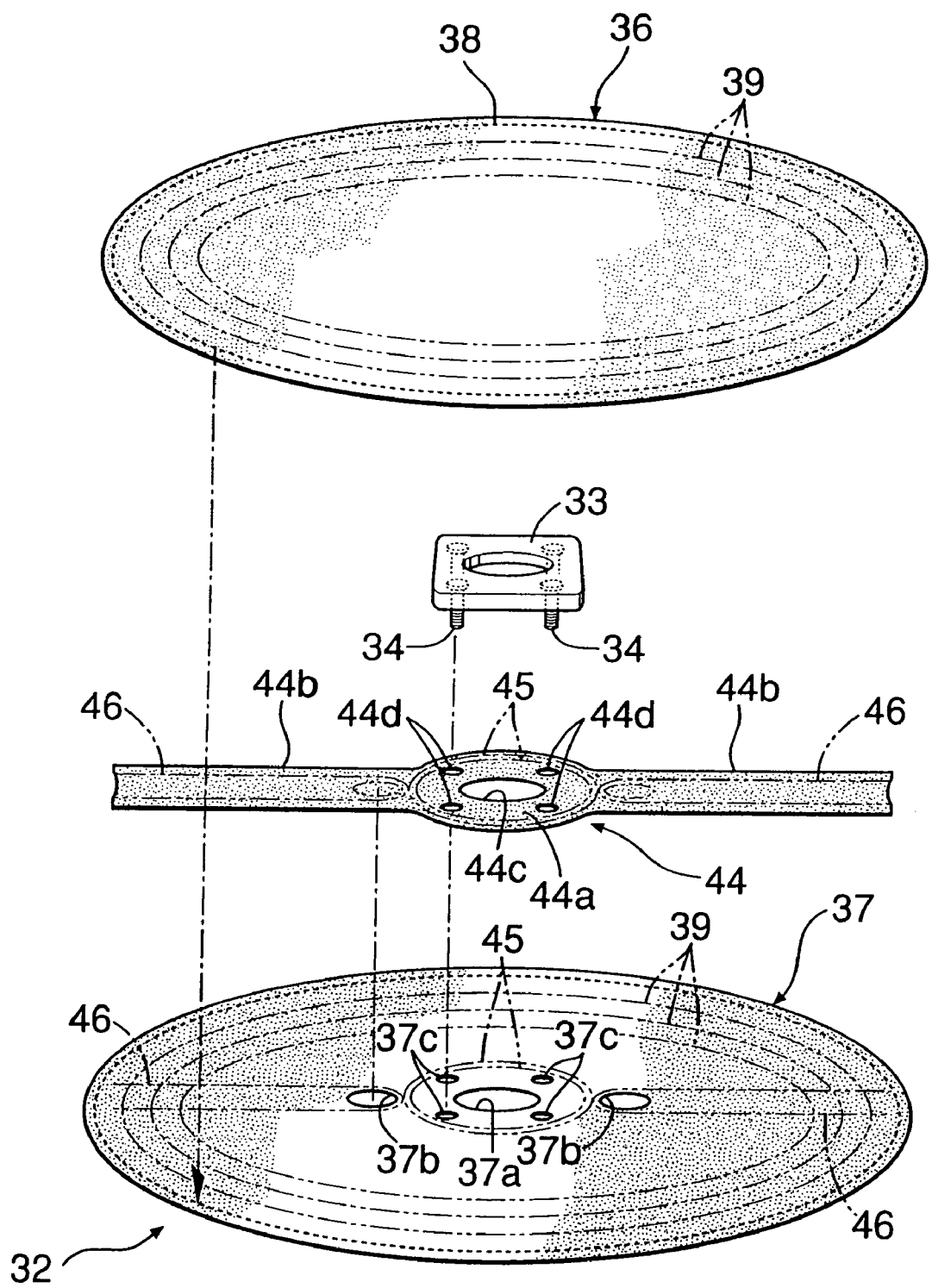
FIGS. 32 and 33 show a twenty-first embodiment of the present invention.
Figure 33:
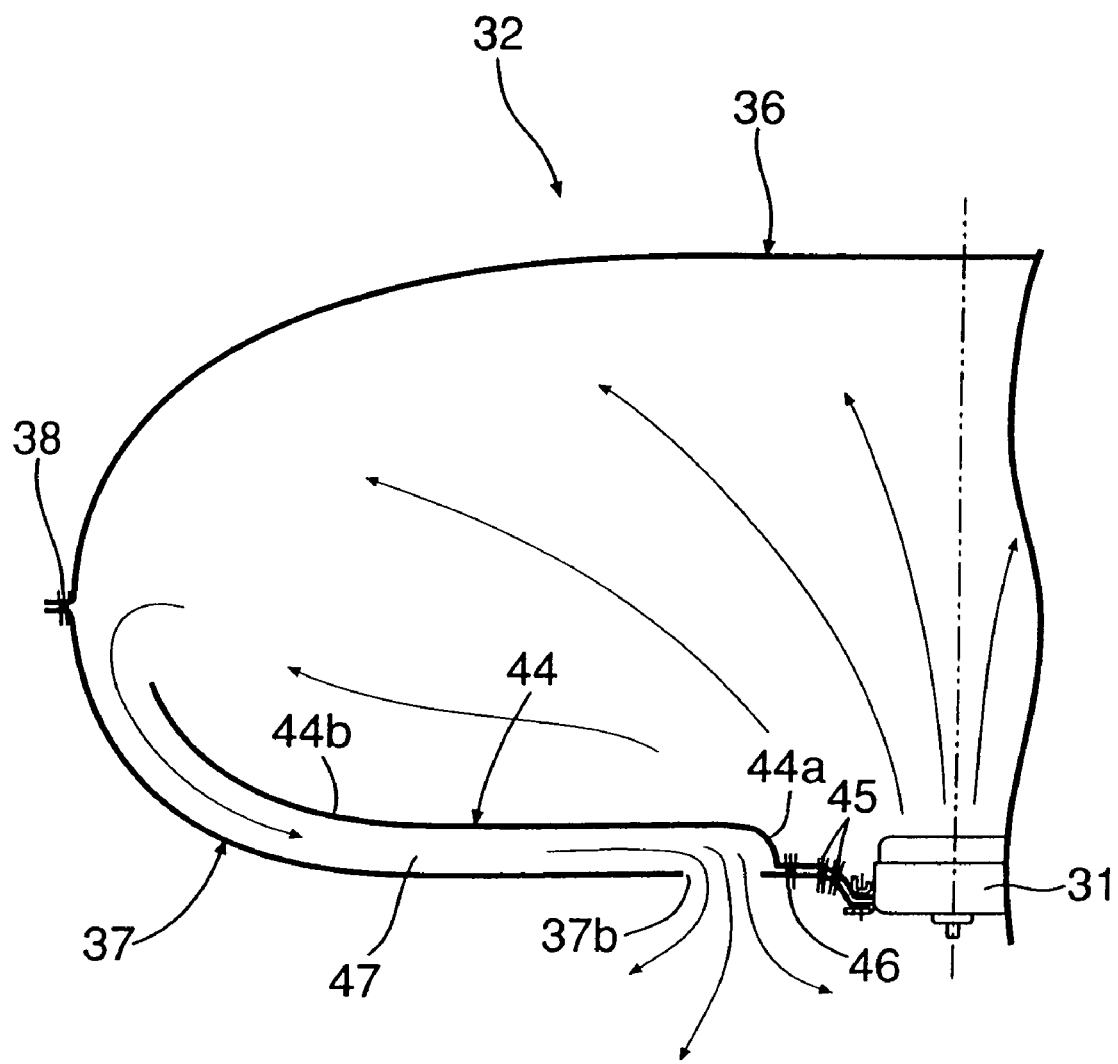

Next, a twenty-first embodiment of the present invention will be described with reference to FIGS. 32 and 33.

The twenty-first embodiment comprises a duct component 44 that is fixed to the inner face of the second base cloth 37. The duct component 44 comprises an annular mounting portion 44a, and two duct portions 44b and 44b extend therefrom in directions going away from each other. A circular aperture 44c and four bolt holes 44d . . . through which bolts 34 . . . pass are formed on mounting portion 44a. The mounting portion 44a is superimposed onto the inner face of the central portion of the second base cloth 37 and sewn together at two seams 45 and 45, while the duct portions 44b and 44b are sewn onto the inner face of the second base cloth 37 by U-shaped seams 46 and 46. Thus, cylindrical ducts 47 and 47 are formed between the duct portions 44b and 44b and the second base cloth 37, with their radially inner ends communicating with the vent holes 37b and 37b, and portions near the radially outer ends are sewn by three seams 39 . . . to prevent communication with the inner space of the airbag 32.

Therefore, at the initial and middle stages of deployment of the airbag 32, the seam 39 . . . closes the ducts 47 and 47 to prevent the vent holes 37b and 37b from functioning. At the final stage of deployment of the airbag 32, the seam 39 . . . breaks to allow the inner space of the airbag 32 to communicate with the vent holes 37b and 37b through the ducts 47 and 47, thereby discharging excess gas to prevent an excess increase of the internal pressure of the airbag 32.

According to this twenty-first embodiment, in addition to the effects of the seventeenth to twentieth embodiments, there is provided an additional effect of adjusting gas discharge through the vent holes 37b and 37b by adjusting the diameters of the ducts 47 and 47.

Figure 34:
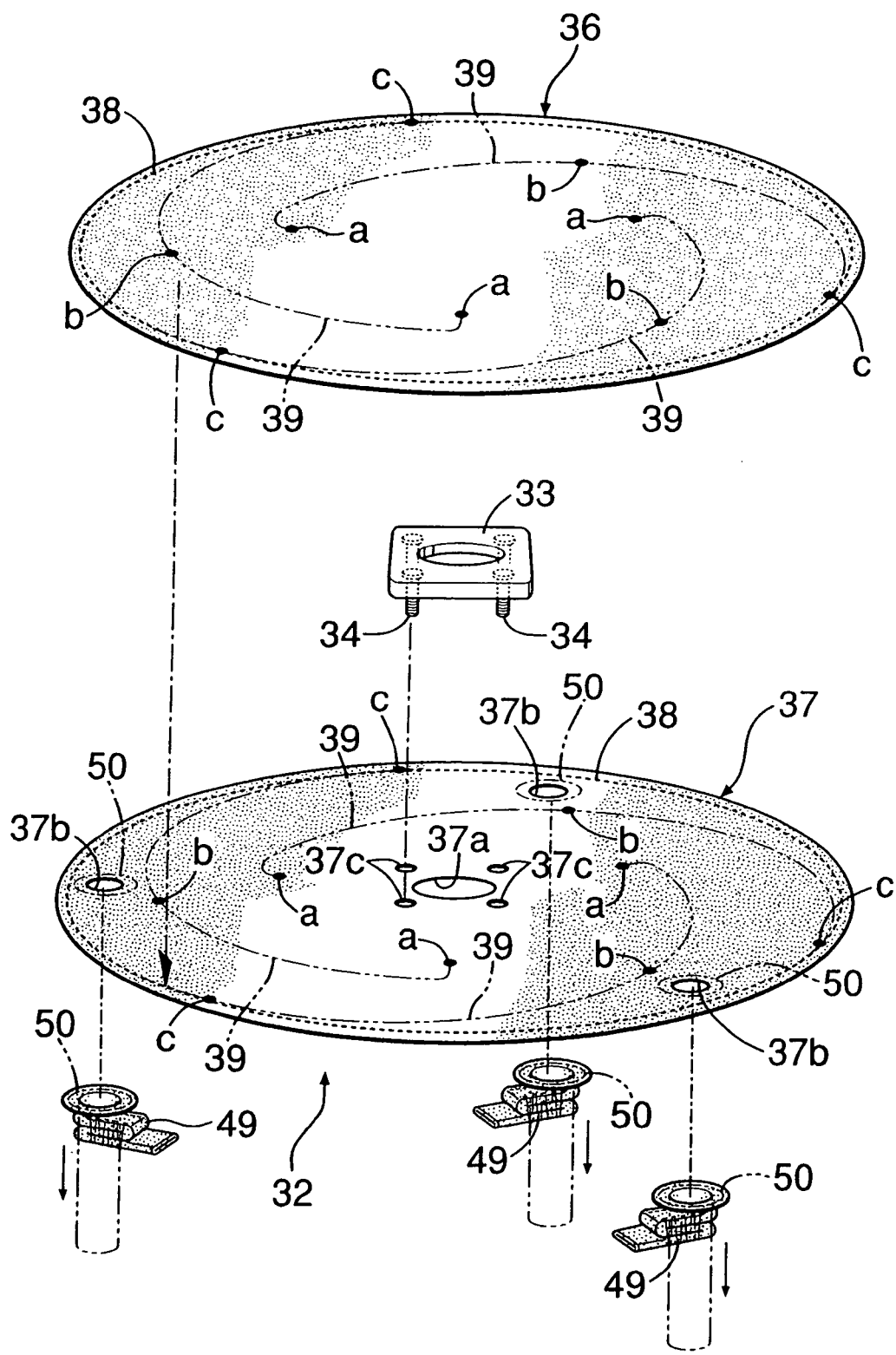
Figure 35A:
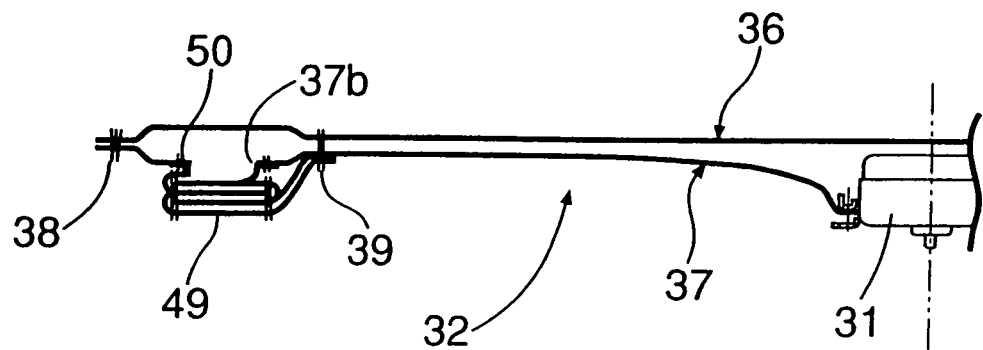
Figure 35B:
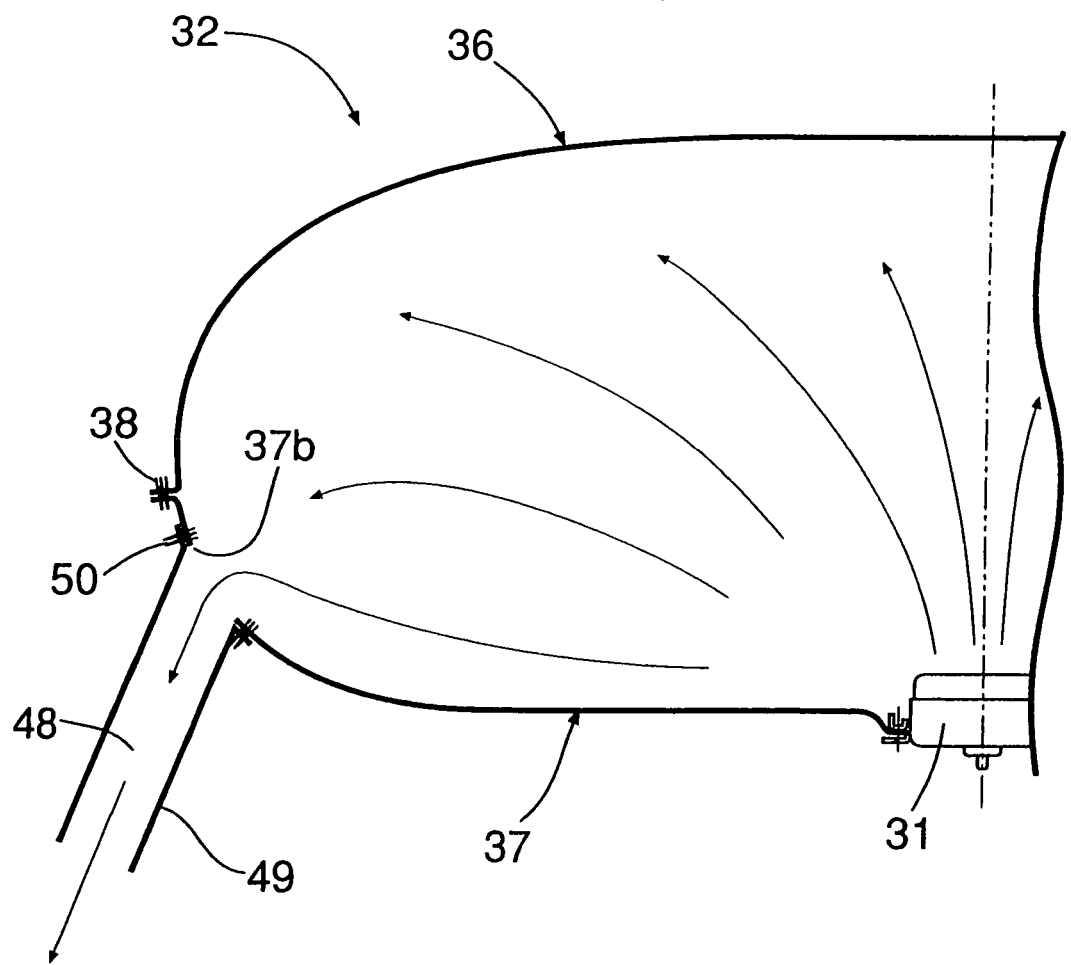

Next, a twenty-second embodiment of the present invention will be described with reference to FIGS. 34 to 35B.

While the twenty-first embodiment comprises two ducts 47 and 47 inside the airbag 32, the twenty-second embodiment comprises three ducts 48 . . . outside the airbag 32. That is, three vent holes 37b . . . are formed at the outer peripheral portion of the second base cloth 37 of the airbag 32, and a base end of a cylindrical duct component 49 . . . formed by the same material as that of the first and second base cloths 36 and 37 are sewn by seam 50 . . . around these vent holes 37b.

The three breakable seams 39, 39 and 39 integral with the first and second base cloths 36 and 37 extend radially into a vortical shape from the inside to the outside, and an end of the folded duct component 49 . . . is integrally sewn thereto by the breakable seam 39 . . . . Moreover, the radially inner end point a of the seam 39 . . . is oriented towards the center of the airbag 32, to promote the start of breaking of the seam 39 . . . by concentrating stress on the point a upon deployment of airbag 32.

Therefore, at the initial and middle stages of deployment of the airbag 32, the seam 39 . . . closes the ducts 48 to prevent the vent holes 37b . . . from functioning. At the final stage of deployment of the airbag 32, the seam 39 . . . breaks to allow the inner space of the airbag 32 to communicate with external air through the vent holes 37b . . . and the duct 48 . . . , thereby discharging excess gas and preventing an excess increase of the internal pressure of the airbag 32.

According to this twenty-second embodiment, in addition to the effects of the seventeenth to twentieth embodiments, there is provided additional effects of adjusting gas discharged through the vent holes 37b . . . by adjusting the diameter of duct 48 . . . , and of preventing gas discharged from the vent hole 37b . . . from hitting the passenger by orienting the duct component 49 . . . towards the front side of the vehicle, i.e., a side opposite from the passenger. Further, by placing the duct 48 . . . outside the airbag 32, the length of the duct 48 . . . can be freely adjusted, thus a still additional effect achieving a further appropriate adjustment of the discharge volume and discharge duration of the gas.

Furthermore, by sewing the first and second base cloths 36 and 37 of the airbag 32 at the vortical seam 39 . . . , and using the stress of the inflation to sequentially break the seam 39 . . . radially from the inside to the outside, the internal pressure, deployment speed, shape and the other aspects of the airbag 32 upon deployment can be arbitrarily controlled, to thereby effectively restrain passengers. In particular, the vortical seam 39 . . . has a generally uniform curvature without portions where the curvature abruptly changes, thus providing a smooth breaking of the seam and a further easier control of the internal pressure, deployment speed, shape and the other aspects of airbag 32 upon deployment.

In addition, in the twenty-second embodiment, when the inflator 31 is ignited in two stages, the internal pressure of the airbag 32 can be further precisely controlled by reducing the strength of seam 39 . . . between the radially inner points a and b, and increasing the strength between the radially outer points b and c; and breaking the seam 39 . . . between points a and b in front of the vent hole 37b . . . with the first ignition of the inflator 31, and breaking the seam 39 . . . between points b and c which includes vent hole 37b . . . with the second ignition of the inflator 31.

For instance, even if there is an error in the timing of the breaking of seam 39 . . . between points a and b by the first ignition of the inflator 31, the error in the timing for opening vent holes 37d . . . can be eliminated by timely breaking the seam 39 . . . between points b and c with the second ignition of the inflator 31 so that the error is compensated for. Of course, the inflator 31 can be ignited in three or more stages.

Figure 36:
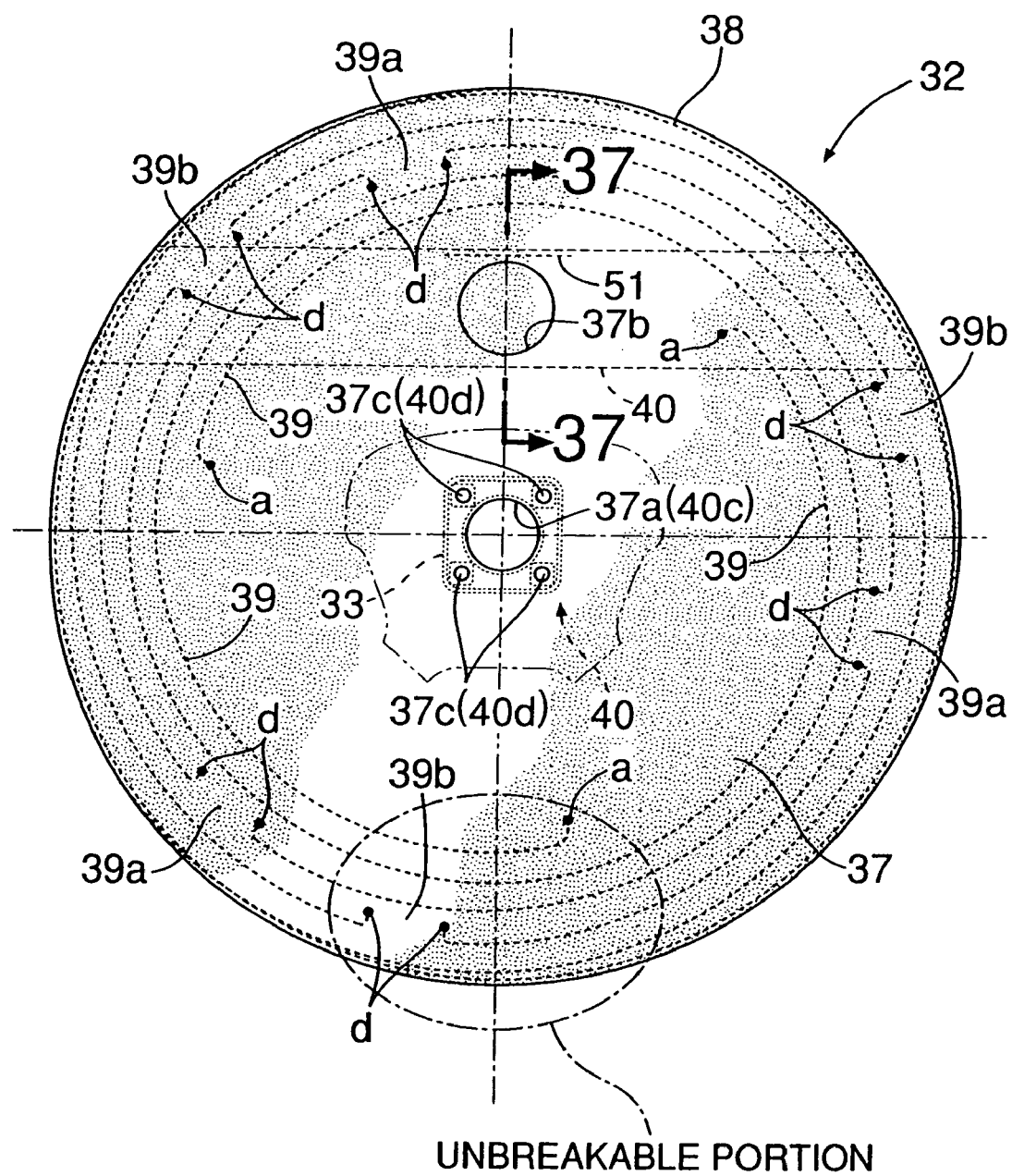
Figure 37A:
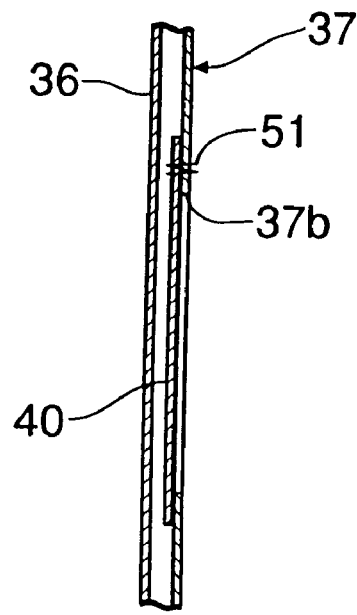
Figure 37B:
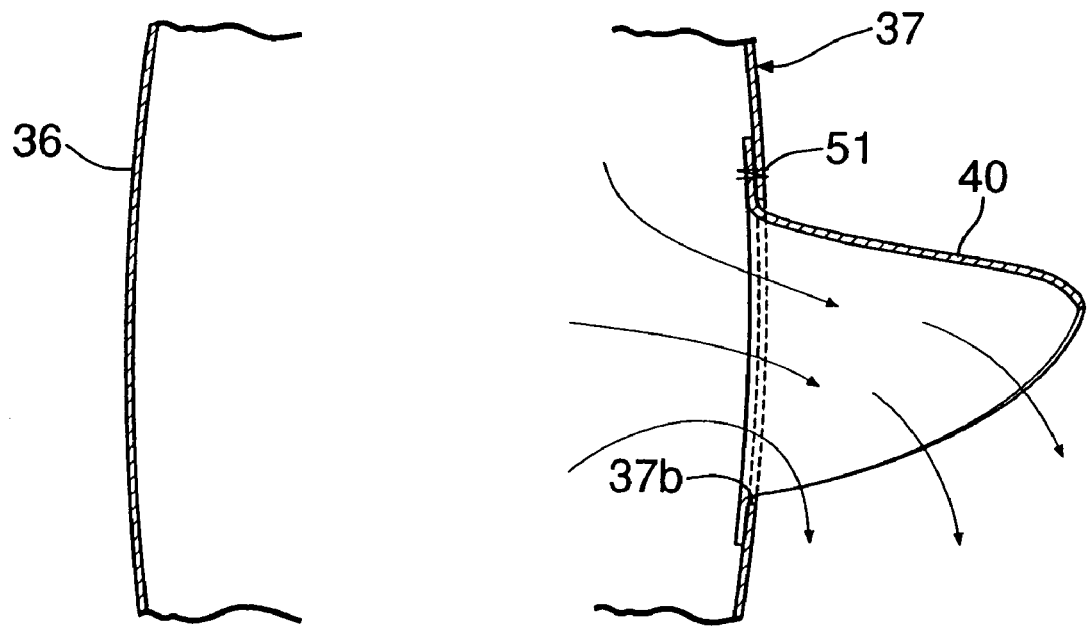

Next, a twenty-third embodiment of the present invention will be described with reference to FIGS. 36 to 37B.

The twenty-third embodiment comprises three seams 39 . . . which sew together the superimposed first and second base cloths 36 and 37 into a vortical shape. Opposite ends of a vent hole cover 40 which covers a single vent hole 37b placed on the second base cloth 37 is integrally sewn by the three seams 39 . . . . In the vicinity of the vent hole 37, a portion located at the outer periphery of the airbag 32 is integrally sewn onto the vent hole cover 40 by a seam 51.

In addition, each seam 39 . . . has a plurality (two in this embodiment) of non-sewn portions 39a and 39b at which sewing is interrupted. The end of the seam 39 . . . , point d which leads to the non-sewn portions 39a and 39b is oriented towards the central portion of airbag 32. The circumferential position of at least one of the two non-sewn portions 39a and 39b (in this embodiment the radially inner non-sewn portion 39a) is misaligned in a circumferential direction from the radially inner end portion point a of the seam 39 . . . .

Therefore, even if a unbreakable portion encircled by a chained line is pressed by something during the deployment of the airbag 32, and breaking which has started at the radially inner end point a of the vortical seam 39 . . . terminates at the unbreakable portion, a new breaking starts at point d facing the two non-sewn portions 39a and 39b of seam 39 . . . in clockwise and counterclockwise directions, ultimately breaking the entire seam 39 . . . except the unbreakable portions, thus deploying most parts of the airbag 32 to exhibit passenger-restraining capability. In this process, since point d facing the two non-sewn portions 39a and 39b of the seam 39 . . . is oriented towards the central portion of the airbag 32 as is the radially inner end point a of the seam 39 . . . , a strong stress can be concentrated thereon to ensure a reliable start of breaking.

Further, since the circumferential position of at least one of the two non-sewn portions 39a and 39b (in this embodiment the radially inside non-sewn portion 39a) is misaligned in a circumferential direction from the radially inner end point a of seam 39 . . . , it is possible to prevent situations where point a and the plurality of points d are all included in the unbreakable portions, thus disabling breaking of seam 39 . . . .

Furthermore, since the vicinity of the vent hole 37b on the side of the outer periphery of the airbag 32 is obstructed by the vent hole cover 40 (refer to FIG. 37B), when the restraints at the opposite ends of the vent hole cover 40 are released to open the vent hole 37b, excess gas discharged from vent hole 37b can be deflected to the center side of the airbag 32.

Figure 38A:
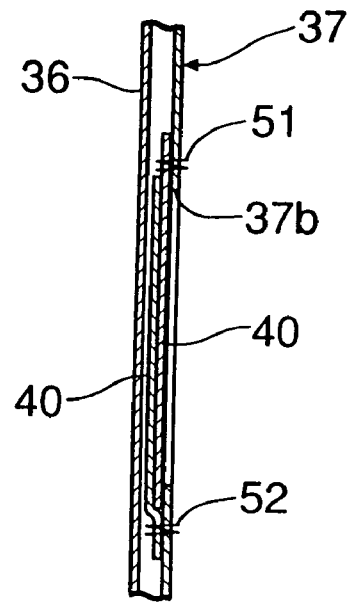
FIGS. 38A and 38B show a twenty-fourth embodiment of the present invention, and respectively corresponding to FIGS. 37A and 37B.
Figure 38B:
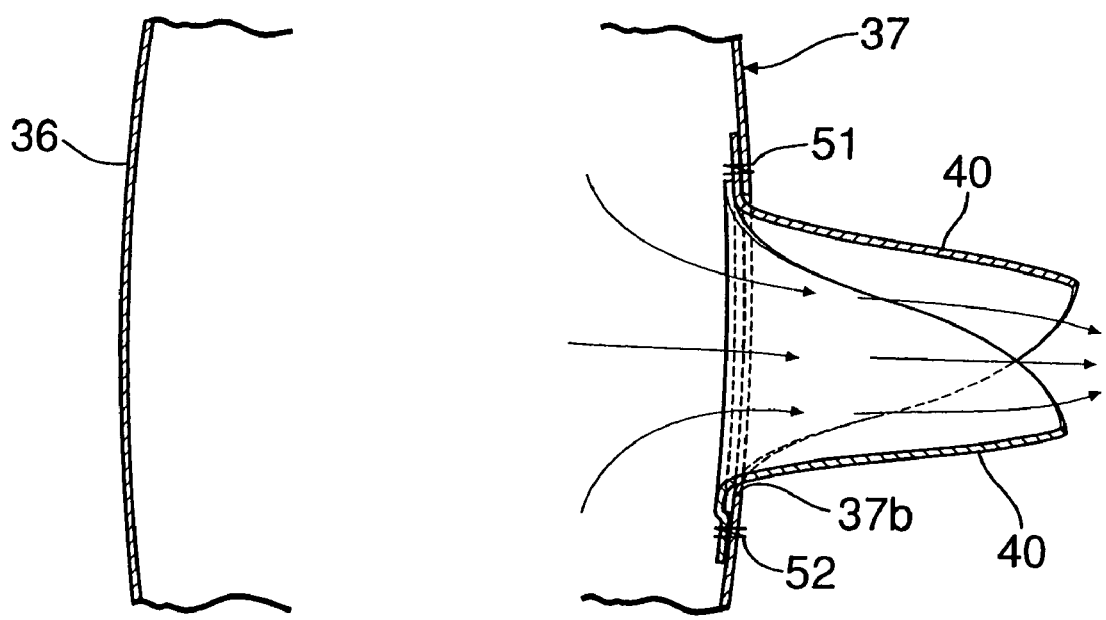

Next, a twenty-fourth embodiment of the present invention will be described with reference to FIGS. 38A and 38B.

In the twenty-third embodiment, the single vent hole cover 40 is sewn by the seam 51 at one side of the vicinity of the vent hole 37b, whereas the twenty-fourth embodiment comprises two vent hole covers 40 and 40 which are superimposed, with one vent hole cover 40 sewn by seam 51 at one side of the vicinity of the vent hole 37b, and the other vent hole cover 40 sewn by seam 52 at one side of the vicinity of the vent hole 39b.

Therefore, the two vent hole covers 40 and 40 cooperate to guide the excess gas by surrounding the vent hole 37b from opposite sides, thus discharging the excess gas straightforward.

Next, a twenty-fifth embodiment of the present invention will be described with reference to FIG. 39.

Figure 26:
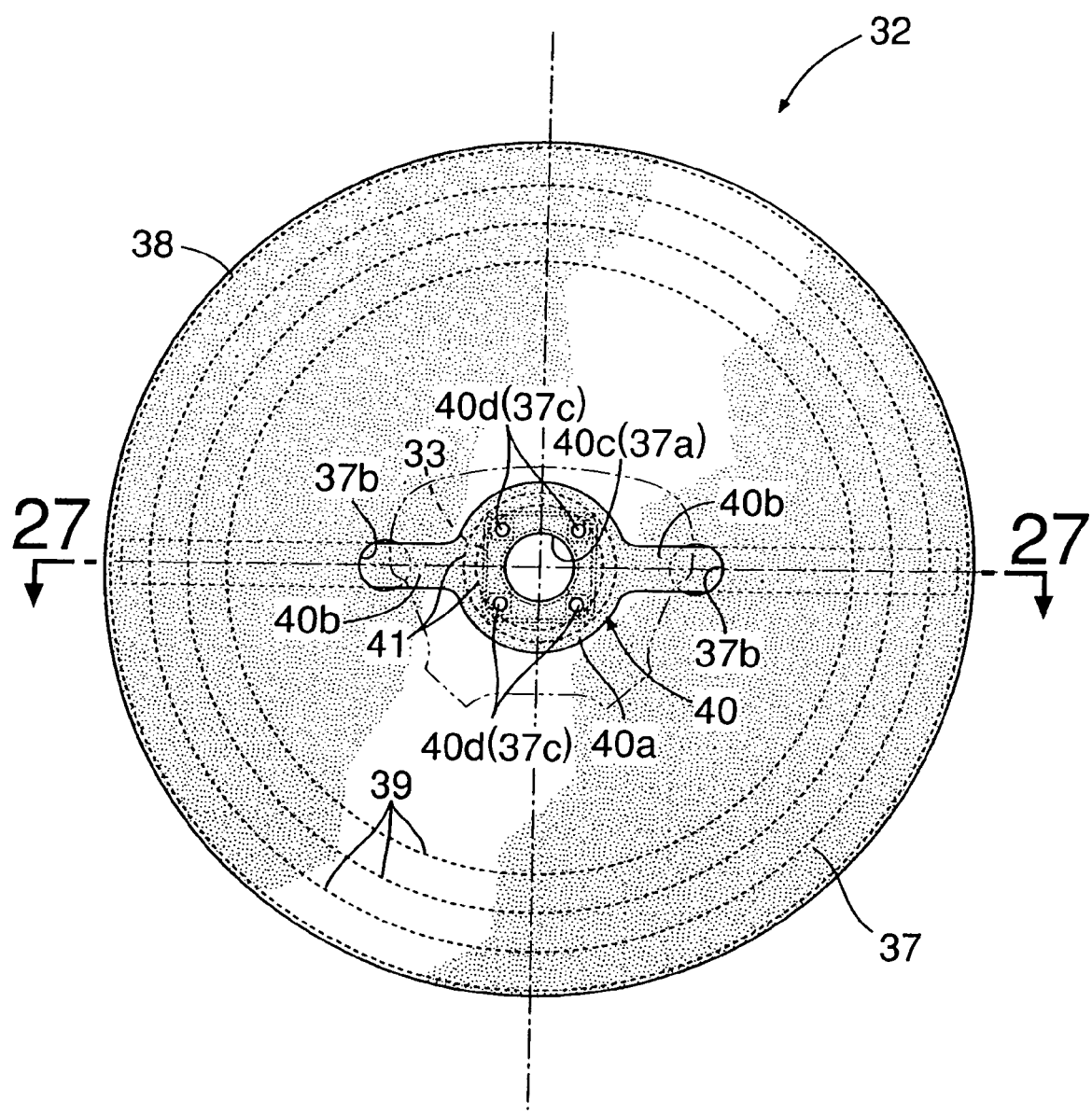
Figure 27:
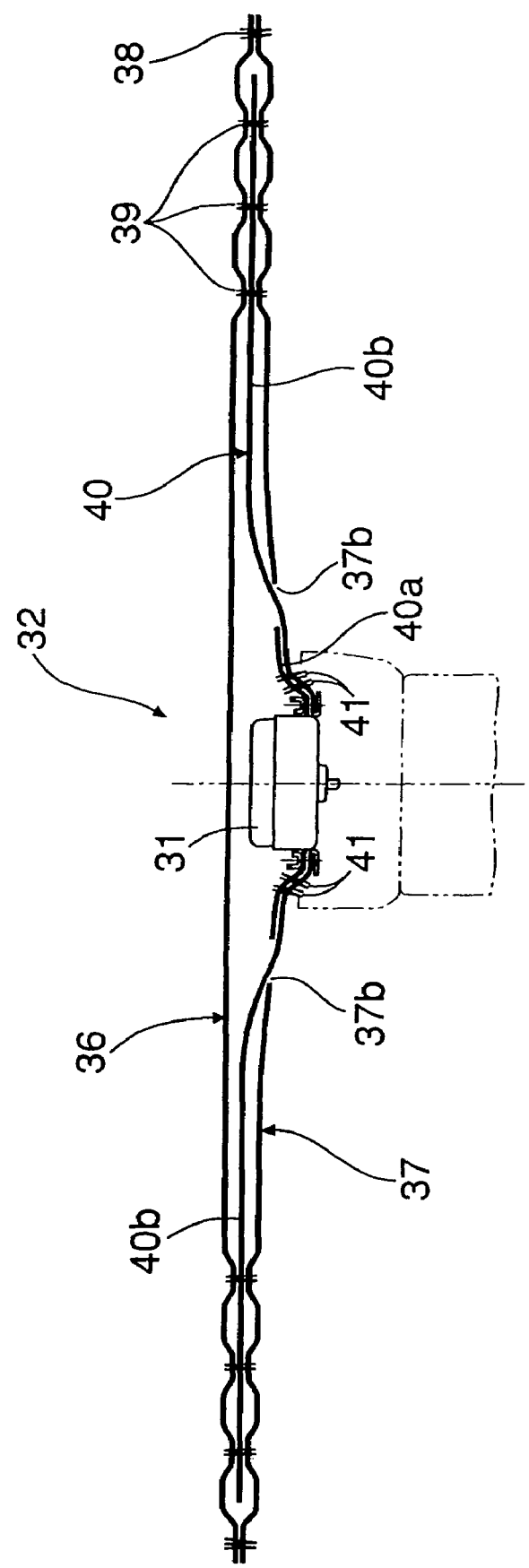

The twenty-fifth embodiment is a variation of the seventeenth embodiment shown in FIG. 26, wherein two vent holes 37b and 37b are formed on the second base cloth 37 among the superimposed first and second base cloths 36 and 37, and a predetermined number (three in this embodiment) of fragile portions 38a ... are formed at the outer peripheral seam 38 of the first and second base cloths 36 and 37. The fragile portions 38a ... are sewn using a thread finer than the other portions of seam 38 for easier breaking.

Thus, even if the two vent holes 37b and 37b remain closed for some reason and are unable to exhibit their functions during the final stage of deployment of airbag 32, when the internal pressure of the airbag reaches or exceeds a predetermined level, the fragile portions 38a of the seam 38 break, and an aperture formed thereon functions as a vent hole to discharge gas, thus preventing an excessive increase of the internal pressure of the airbag 32.

Figure 40:
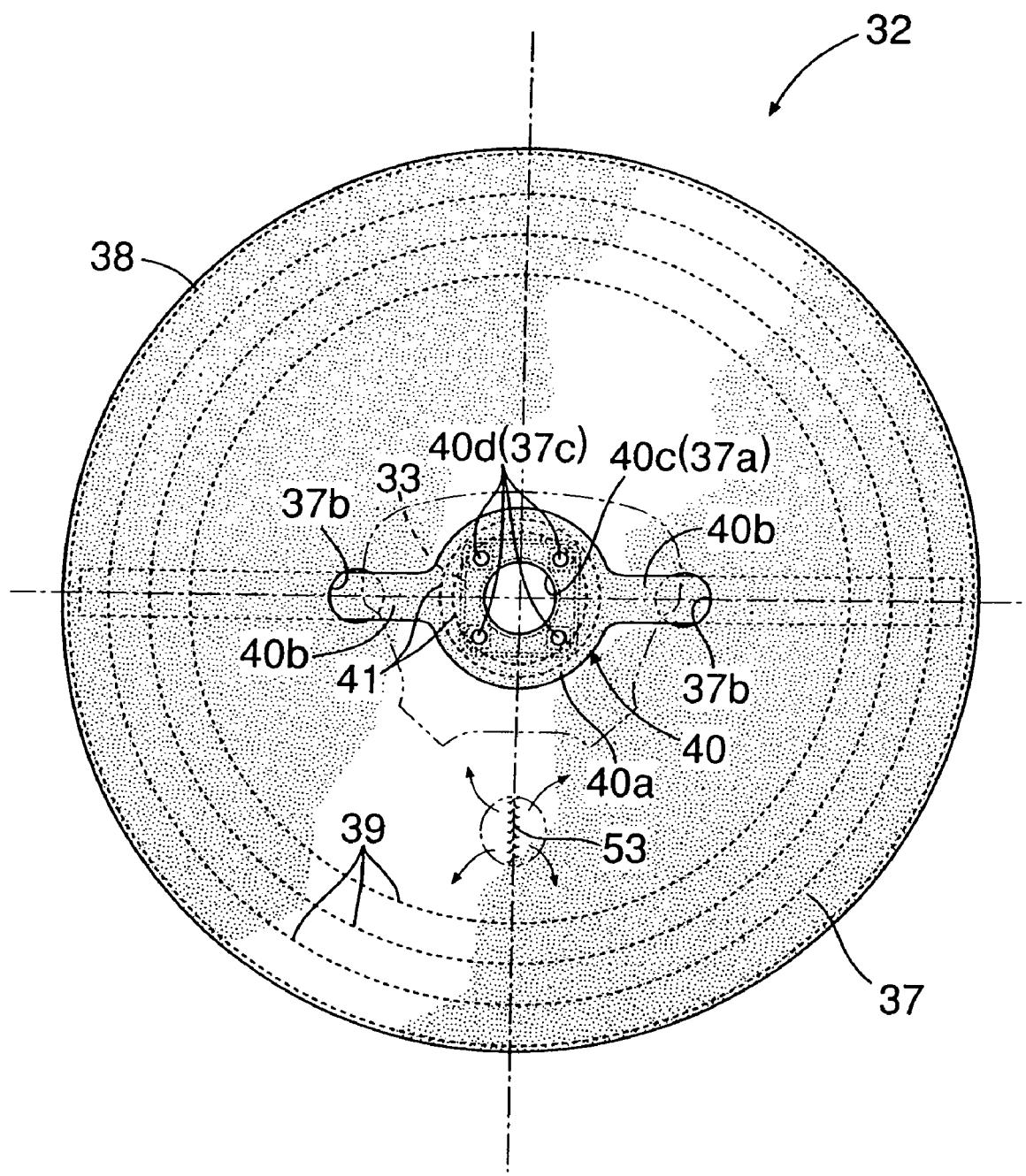
FIG. 40 is a drawing according to a twenty-sixth embodiment of the present invention, corresponding to FIG. 26.

Next, a twenty-sixth embodiment of the present invention will be described with reference to FIG. 40.

Figure 39:
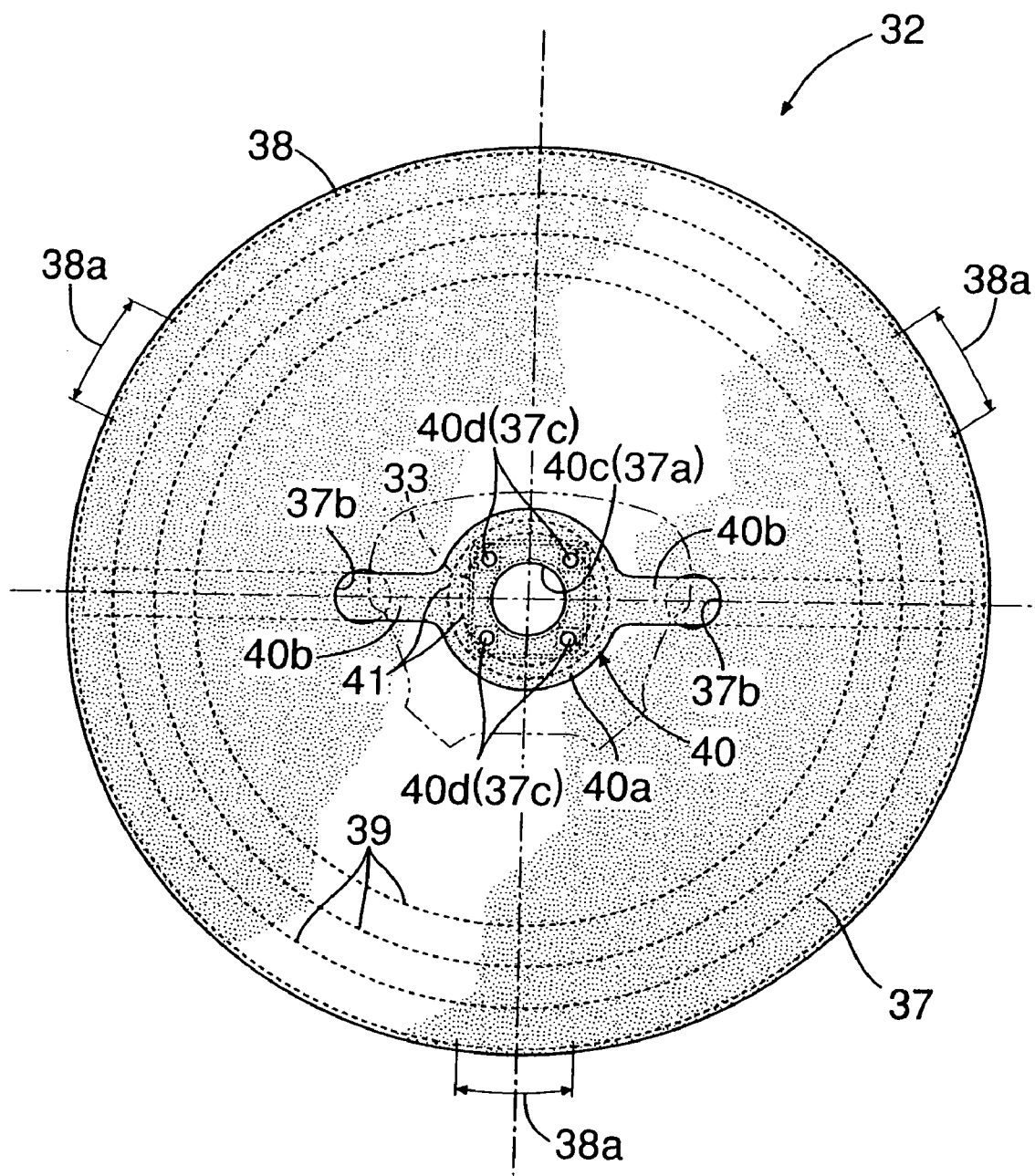
FIG. 39 is a drawing according to a twenty-fifth embodiment of the present invention, corresponding to FIG. 26.

The twenty-sixth embodiment is a variation of the twenty-fifth embodiment shown in FIG. 39. While the fragile portions 38a ... were formed on the seam 38 in the twenty-fifth embodiment, a fragile portion 53 sewn so as to close a slit cut linearly into the second base cloth 37 is formed in the twenty-sixth embodiment. The breaking strength of the fragile portion 53 is set to be higher than the seams 39, at the same time lower than the seam 38.

Thus, even if the two vent holes 37b and 37b remain closed for some reason and are unable to exhibit their functions at the final stage of deployment of airbag 32, when the internal pressure of the airbag 32 reaches or exceeds a predetermined level, the fragile portion 53 breaks and an aperture formed thereon functions as a vent hole to discharge gas, thus preventing an excessive increase of the internal pressure of the airbag 32.

Having described the embodiments of the present invention, it is understood that various design changes can be made without departing from the subject matter of the present invention.

For instance, while the first and second base cloths 36 and 37 are sewn by the seam 39 ... in the above embodiments, sewing may be replaced with an arbitrary joining means such as adhesive.

Further, the internal pressure of airbag 32 can be controlled by changing the seam strength (bonding strength of the bonding portion) of the seam 39, thread thickness, thread material, seam density, length of seam 39 ..., number of lap-seams etc. Generally, increasing the breaking strength or lengthening the seam 39 ... makes it difficult for the airbag 32 to increase its volume, resulting in an increased internal pressure, while the opposite will allow the airbag 32 to increase its volume more easily, resulting in a decreased internal pressure.

Additionally, in the embodiments with a plurality of the vortical seams 39 ... or the switchbacking seams 39 ..., by narrowing the distance between seams 39 ..., i.e., by decreasing the cross section of the influx passage of the pressurized gas, it will become difficult for the airbag 32 to increase its volume, resulting in an increased internal pressure, while the opposite allows the airbag 32 to increase its volume more easily, resulting in a decreased internal pressure. For example, in the first or third embodiment, the cross section of the influx passage of the pressurized gas can be arbitrarily adjusted by widening or narrowing the distance between the seams 39 ... by making the vortical seams 39 ... partially serpentine.

Further, by combining portions of high and low breaking strengths in a single seam 39, the internal pressure of the airbag 32 can be more minutely controlled. Particularly, strengthening the breaking strength of breaking starting point a of the seam 39 does not make the seam 39 susceptible to breaking at the initial stage of deployment, the internal pressure of the airbag 32 is quickly increased at the early stage of deployment to secure a required passenger restraining force, and thereafter by breaking seam 39, the internal pressure of the airbag 32 can be kept substantially uniform to enable an optimum performance in restraining passengers.

Furthermore, in the embodiments wherein starting point a of seam 39 ... is not oriented towards the central portion of the airbag 32, such points may be oriented towards the central portion of airbag 32.

Moreover, arbitrary combination of the various features of the embodiments described above shall also be included in the embodiments of the present invention.

What is claimed is:

1. An airbag device comprising an airbag, the airbag comprising first and second base cloths sewn at their outer peripheries, and inflated by supplying gas generated by an inflator to the inside of the airbag through a central portion of one base cloth upon collision of a vehicle,
   wherein the first and second base cloths are joined by a plurality of bonding portions continuously extending in a generally circumferential direction,
   wherein said plurality of bonding portions are vortical and provided each continuously extending from one end thereof near the central portion toward the other end thereof near the outer periphery, and
   wherein a load caused by inflation of the airbag breaks each of the bonding portions sequentially from the central portion end to the outer periphery end thereof.

2. The airbag device according to claim 1, wherein the bonding portions are divided into a plurality of parts in a radial direction of the airbag.

3. The airbag device according to claim 1, wherein each bonding portion has separation portions where bondage is interrupted, and the separation portions are disposed at different locations in a circumferential direction in relation to said one end of the bonding portion.

4. The airbag device according to claim 1, wherein each bonding portion has separation portions where bondage is interrupted, and inner ends of the separation portions are oriented towards the central portion of the airbag.

5. The airbag device according to claim 1, wherein said one end of the bonding portion near the central portion is oriented toward the center of the airbag.

6. An airbag device comprising an airbag, the airbag comprising first and second base cloths sewn together at their outer peripheries, and inflated by supplying gas generated by an inflator to the inside of the airbag through a central portion of one base cloth upon collision of a vehicle,
   wherein the first and second base cloths are joined by a plurality of bonding portions continuously extending in a generally circumferential direction,
   wherein said plurality of bonding portions are provided each continuously extending from one end thereof near the central portion toward the other end thereof near the outer periphery,
   wherein a load caused by inflation of the airbag breaks each of the bonding portions sequentially from the central portion end to the outer periphery end thereof, and
   wherein an end of a vent hole cover which closes a vent hole formed on at least one of the first and second base cloths is joined to one said bonding portion at the radially outer side of the airbag, and wherein the end of the vent hole cover is separated from the first and second base cloths by breaking of the bonding portion to open the vent hole.

7. The airbag device according to claim 6, wherein at least one of the first and second base cloths has a gas discharge portion which is opened when the vent hole fails to function and internal pressure of the airbag reaches or exceeds a predetermined level, thereby depressurizing the airbag.

8. The airbag device according to claim 6, wherein said one end of the bonding portion near the central portion is oriented toward the center of the airbag.

9. An airbag device comprising an airbag, the airbag comprising first and second base cloths sewn at their outer peripheries, and inflated by supplying gas generated by an inflator to the inside of the airbag through a central portion of one base cloth upon collision of a vehicle, wherein the first and second base cloths are joined by a plurality of bonding portions continuously extending in a generally circumferential direction, wherein said plurality of bonding portions are provided each continuously extending from one end thereof near the central portion toward the other end thereof near the outer periphery, said one end of the bonding portion near the central portion has a separation strength larger than that of the other parts, and wherein a load caused by inflation of the airbag breaks each of the bonding portions sequentially from the central portion end to the outer periphery end thereof.

10. The airbag device according to claim 9, wherein said one end of the bonding portion near the central portion is oriented toward the center of the airbag.

* * * * *